US012611876B2

(12) United States Patent
Kim et al.

(10) Patent No.: US 12,611,876 B2
(45) **Date of Patent: *Apr. 28, 2026**

(54) PRINTING DEVICE

(71) Applicant: BIXOLON CO., LTD., Seongnam-si (KR)

(72) Inventors: Jin Gwan Kim, Yongin-si (KR); Jin Kook Kim, Suwon-si (KR)

(73) Assignee: BIXOLON CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/916,438

(22) Filed: Oct. 15, 2024

(65) Prior Publication Data

US 2025/0033388 A1 Jan. 30, 2025

Related U.S. Application Data

(62) Division of application No. 18/196,429, filed on May 11, 2023, now Pat. No. 12,145,357, which is a (Continued)

(30) Foreign Application Priority Data

Feb. 11, 2020 (KR) ........................ 10-2020-0016356
Feb. 11, 2020 (KR) ........................ 10-2020-0016357
Apr. 28, 2020 (KR) ........................ 10-2020-0051341
Apr. 28, 2020 (KR) ........................ 10-2020-0051342
Apr. 28, 2020 (KR) ........................ 10-2020-0051343

(51) Int. Cl.
*B41J 15/04* (2006.01)
*B41J 2/32* (2006.01)

(52) U.S. Cl.
CPC ................ *B41J 15/04* (2013.01); *B41J 2/32* (2013.01); *B41J 2202/30* (2013.01)

(58) Field of Classification Search
CPC .... B41J 15/04; B41J 11/0045; B41J 2202/30; B41J 11/703; B41J 2/32; B41J 2/315; B41F 16/00
See application file for complete search history.

(56) References Cited

U.S. PATENT DOCUMENTS 11,358,402 B2 6/2022 Kim
11,607,898 B2 * 3/2023 Kim ........................ B41J 11/703
(Continued)

*Primary Examiner* — Kristal Feggins
(74) *Attorney, Agent, or Firm* — Maschoff Brennan

(57) ABSTRACT

Disclosed is a printing device including a main body part including a body part configured to provide an internal space in which recording paper for printing certain information thereon is transferred and an opening or closing part configured to control opening or closing of the internal space, a printing part configured to print the certain information on the recording paper transferred in the internal space, and a recording paper separation part located on a downstream side of the printing part and configured to cut or cut off and separate recording paper on which particular information is printed by the printing part from the other recording paper. Here, the main body part includes a protruding part configured to prevent an adhesive attached to the surface opposite the adhesive surface from being accumulated by decreasing a contact area with the surface opposite the adhesive surface.

9 Claims, 25 Drawing Sheets

Related U.S. Application Data division of application No. 17/839,317, filed on Jun. 13, 2022, now Pat. No. 11,679,607, and a division of application No. 17/174,342, filed on Feb. 11, 2021, now Pat. No. 11,358,402.

(56) References Cited

U.S. PATENT DOCUMENTS

| | | | | |
|---|---|---|---|---|
| 12,145,357 | B2 * | 11/2024 | Kim | B41J 11/703 |
| 2006/0039737 | A1 | 2/2006 | Takami et al. | |
| 2008/0267682 | A1 | 10/2008 | Osawa et al. | |
| 2014/0210937 | A1 | 7/2014 | Nomura | |
| 2017/0274679 | A1 | 9/2017 | Nitta | |
| 2017/0341427 | A1 | 11/2017 | Oguchi et al. | |
| 2019/0286038 | A1 | 9/2019 | Seki et al. | |

* cited by examiner

PRINTING DEVICE

CROSS-REFERENCE TO RELATED APPLICATION

This application is a Division of U.S. patent application Ser. No. 17/196,429, filed on May 11, 2023, which is a Division of U.S. patent application Ser. No. 17/839,317, filed on Jun. 13, 2022, which is a Division of U.S. patent application Ser. No. 17/174,342, filed on Feb. 11, 2021. U.S. patent application Ser. No. 17/174,342, filed on Feb. 11, 2021 claims priority to and the benefit of Korean Patent Application Nos. 10-2020-0016356, filed on Feb. 11, 2020, 10-2020-0016357, filed on Feb. 11, 2020, 10-2020-0051341, filed on Apr. 28, 2020, 10-2020-0051342, filed on Apr. 28, 2020, 10-2020-0051343, filed on Apr. 28, 2020, all of which are incorporated herein by reference in their entirety.

BACKGROUND

1. Field of the Invention

The present invention relates to a printing device, and more particularly, to a printing device configured to implement smooth transfer of recording paper, to prevent an accumulation of an adhesive, and to prevent a phenomenon that an end of the printing paper is rolled so as to prevent printing qualities from being influenced.

2. Discussion of Related Art

A thermal printer is a type of nonimpact printer in which a particular recording paper which reacts to heat is used and heat is applied to the recording paper using a printer head to form color so as to allow a letter or a picture to be shown.

That is, since it is possible to implement printing of letters and a variety of graphics without using toner, ink, or the like, such thermal printers have been used adequately for printing a variety of labels, receipts, tickets, and the like.

The thermal printer includes an accommodation part accommodating a roll of recording paper and performs printing by withdrawing recording paper from the roll accommodated in the accommodation part.

Here, the recording paper withdrawn from the roll passes through a space between a printer head and a platen roller due to an interaction between a pressurizing roller and a feeding roller while a variety of pieces of information are printed on the recording paper.

Meanwhile, the feeding roller configured to transfer the recording paper and the platen roller configured to perform printing are gradually worn down as hours of use increase such that diameters decrease. In the case of the feeding roller, as the diameter gradually decreases, a gap between the feeding roller and the pressurizing roller increases such that a problem in transfer of the recording paper is caused.

Also, in the case of the platen roller, since printing qualities are influenced when the diameter decreases to a certain size or less, it is necessary to replace the platen roller with a new platen roller at the correct point in time. However, in conventional printing devices, it is difficult to estimate an accurate replacement time such that a serious problem, such as replacement after printing qualities are degraded, is caused.

Accordingly, it is necessary to urgently research a printer configured to overcome degradation in transfer of the recording paper caused by abrasion of the feeding roller and to estimate the correct replacement time of the platen roller.

Meanwhile, the conventional thermal printer is configured to print letters and the like on so-called linerless recording paper with one surface to which an adhesive is applied and employs a variety of components to prevent the adhesive from being accumulated on a particular component when the linerless recording paper is used.

However, since the recording paper is provided as a roll, a surface opposite to an adhesive surface is soiled with the adhesive. A problem caused by the adhesive soiled on the surface opposite the adhesive surface is not recognized at all such that research for solving a variety of such problems caused thereby is poor.

Also, since the recording paper is provided as a roll, a phenomenon in which an end of the recording paper is rolled occurs. Due to the phenomenon, the recording paper is not stably discharged through an outlet and is held by a particular component such that a jamming phenomenon is caused.

Accordingly, it is urgent to research in order to solve problems caused by the adhesive, problems caused by the rolled end, and the like.

SUMMARY OF THE INVENTION

The present invention is directed to providing a printing device configured to solve problems caused by recording paper provided as a roll such as soiling of a surface opposite an adhesive surface with an adhesive, accumulation of the adhesive derived therefrom, and a jamming phenomenon caused by a rolled end of the recording paper.

The present invention is also directed to providing a printing device configured to implement smooth transfer of recording paper to print certain information thereon while simultaneously preventing degradation of printing qualities by estimating an accurate replacement time of a platen roller.

According to an aspect of the present invention, there is provided a printing device including a main body part including a body part configured to provide an internal space in which recording paper for printing certain information thereon is transferred and an opening or closing part configured to control opening or closing of the internal space, in which the recording paper is provided as a roll and withdrawn and transferred in the internal space, a printing part configured to print the certain information on the recording paper transferred in the internal space and the printing part including a head configured to generate heat to print the certain information and a release roller disposed at a position corresponding to the head and configured to transfer the recording paper, and a recording paper separation part located on a downstream side of the printing part and configured to cut or cut off and separate recording paper on which particular information is printed by the printing part from the other recording paper. Here, the main body part includes a first support part configured to support an adhesive surface of the recording paper being transferred in the internal space and a second support part configured to support a surface opposite the adhesive surface. Also, the second support part includes a protruding part configured to prevent an adhesive attached to the surface opposite the adhesive surface from being accumulated by decreasing a contact area with the surface opposite the adhesive surface.

A plurality of such protruding parts may be formed to be spaced apart from each other along a transfer direction of the recording paper.

The second support part may include a second upstream support part and a second downstream support part located on an upstream side and a downstream side on the basis of the head, respectively. The protruding part may be formed on at least one of the second upstream support part and the second downstream support part. The second upstream support part may have a round or tetrahedral upstream end to provide a space in which the adhesive attached to the surface opposite the adhesive surface is to be accumulated while the recording paper is transferred.

The upstream end may be included in an area in which the protruding parts are not formed so that the contact area with the opposite surface may increase so as to easily accumulate the adhesive.

The second upstream support part may be implemented to be coated with a release agent, to be bonded with a tape including a release ingredient, or to be a material including a release ingredient. Also, the upstream end may correspond to an area excluding the release agent.

The second upstream support part may be formed to be coarse to prevent the adhesive attached to the surface opposite the adhesive surface from being accumulated. The upstream end may not be included in the coarse area.

The upstream end may have a lowermost point configured to support the opposite surface and located below a lowermost point of a third support part that is present further upstream than the upstream end and a lowermost point of the head so as to easily accumulate the adhesive in the space.

The second support part may include a second upstream support part and a second downstream support part located on an upstream side and a downstream side on the basis of the head, respectively. The protruding part may be formed on at least one of the second upstream support part and the second downstream support part. The second upstream support part may have a round or tetrahedral downstream end to provide a space in which an adhesive attached to a surface opposite an adhesive surface of each sheet of the other recording paper is to be accumulated while the recording paper is cut or cut off by the recording paper separation part and the other recording paper is backfed.

The downstream end may be included in an area in which the protruding parts are not formed so that the contact area with the opposite surface may increase so as to easily accumulate the adhesive.

The second upstream support part may be implemented to be coated with a release agent, to be bonded with a tape including a release ingredient, or to be a material including a release ingredient. Also, the downstream end may correspond to an area excluding the release agent.

The second upstream support part may be formed to be coarse to prevent the adhesive attached to the surface opposite the adhesive surface from being accumulated. The downstream end may not be included in the coarse area.

The downstream end may have a lowermost point configured to support the opposite surface and located below a lowermost point of a third support part that is present further upstream than an upstream end and a lowermost point of the head so as to easily accumulate the adhesive in the space.

The second support part may include a second upstream support part and a second downstream support part located on an upstream side and a downstream side on the basis of the head, respectively. The protruding part may be formed on at least one of the second upstream support part and the second downstream support part. The second downstream support part may have a round or tetrahedral downstream end to provide a space in which an adhesive attached to a surface opposite an adhesive surface of each sheet of the other recording paper is to be accumulated while the recording paper is cut or cut off by the recording paper separation part and the other recording paper is backfed.

The downstream end may be included in an area in which the protruding parts are not formed so that the contact area with the opposite surface may increase so as to easily accumulate the adhesive.

The second downstream support part may be implemented to be coated with a release agent, to be bonded with a tape including a release ingredient, or to be a material including a release ingredient. Also, the downstream end may correspond to an area excluding the release agent.

The second downstream support part may be formed to be coarse to prevent the adhesive attached to the surface opposite the adhesive surface from being accumulated. The downstream end may not be included in the coarse area.

At least one of the first support part and the second support part may be formed to be coarse to prevent the adhesive attached to the surface opposite the adhesive surface from being accumulated.

At least one of the first support part and the second support part may be implemented to be coated with a release agent, to be bonded with a tape including a release ingredient, or to include a material including a release ingredient to prevent the adhesive attached to the surface opposite the adhesive surface from being accumulated.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
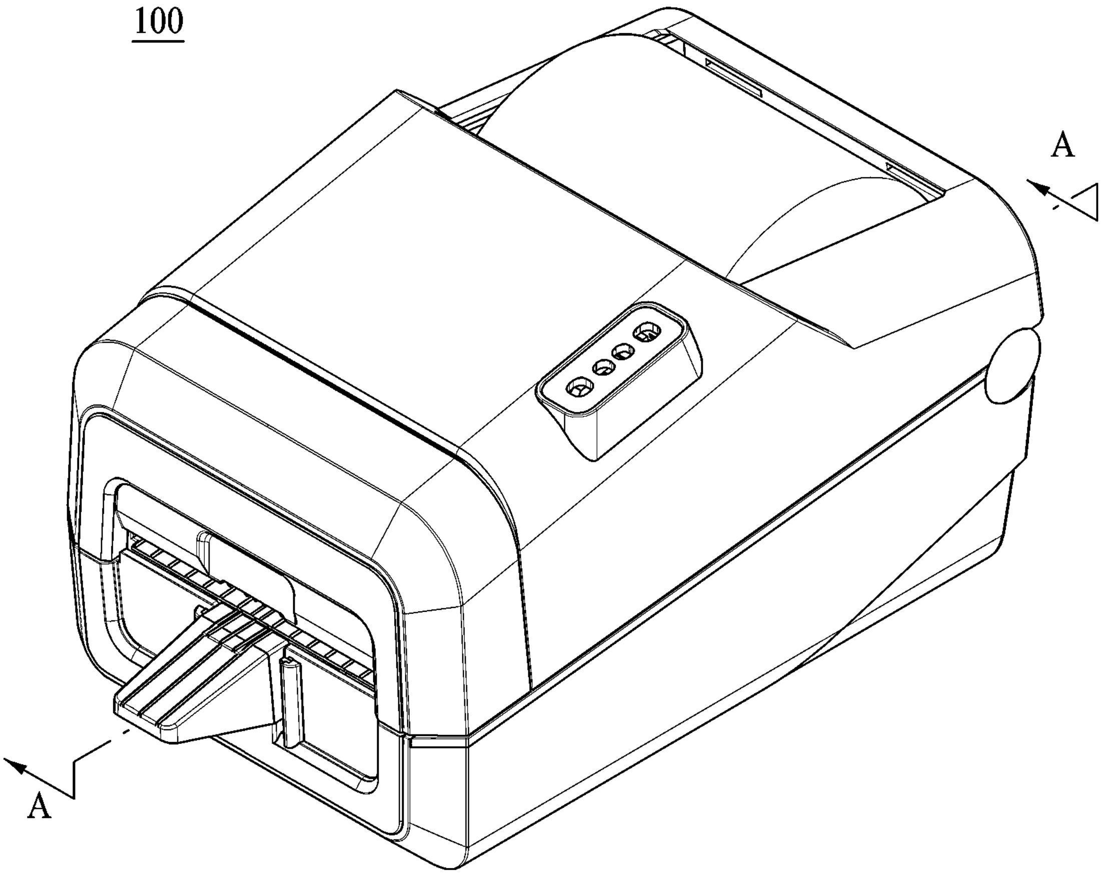
FIG. 1 is a schematic perspective view illustrating a printing device according to one embodiment of the present invention.

Hereinafter, detailed embodiments of the present invention will be described in detail with reference to the drawings. However, the concept of the present invention is not limited to the disclosed embodiments, and one of ordinary skill in the art may easily implement retrogressive invention or other embodiments included in the conceptual scope of the present invention through addition, change, deletion, and the like of another component without departing from the conceptual scope, which should be included in the conceptual scope of the present invention.

Also, in the drawings with respect to the embodiments, elements having the same function within the same conceptual scope will be referred to as the same reference numerals.

Figure 2:
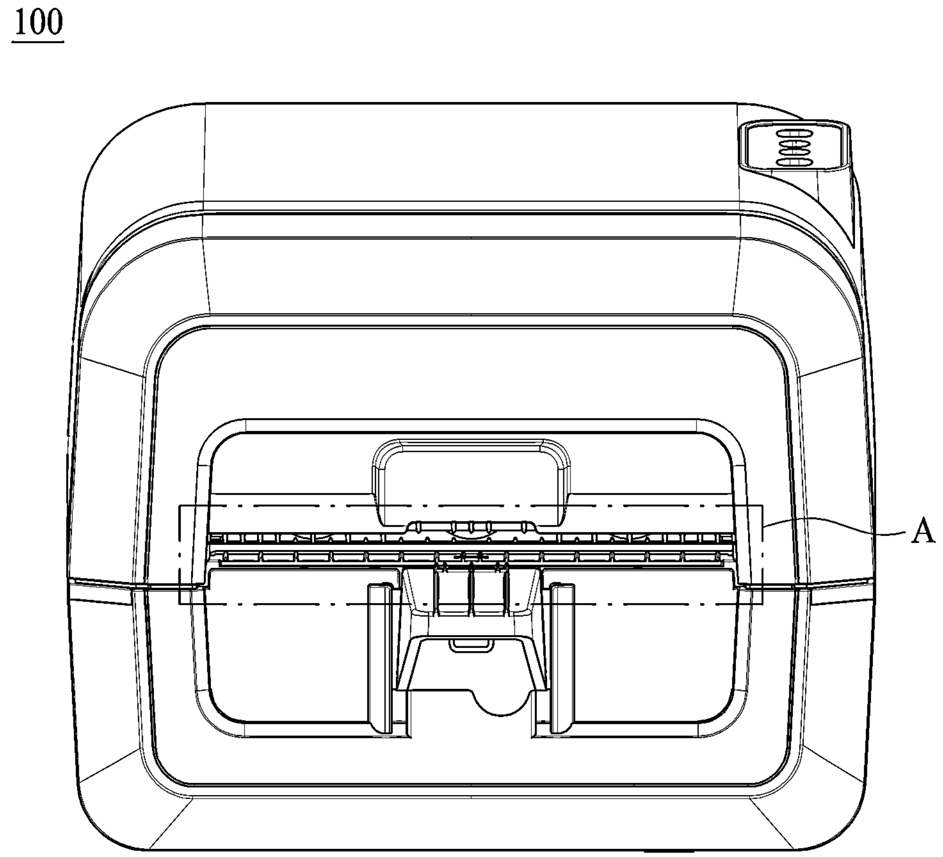
FIG. 2 is a schematic front view illustrating the printing device according to one embodiment of the present invention.

FIG. 1 is a schematic perspective view illustrating a printing device according to one embodiment of the present invention, and FIG. 2 is a schematic front view illustrating a printing device according to one embodiment of the present invention.

Referring to FIGS. 1 and 2, a printing device 100 according to one embodiment of the present invention is a device configured to print certain information on recording paper and may be a device configured to be used adequately for printing, for example, a variety of labels, receipts, tickets and the like.

The printing device 100 may be, for example, a thermal printer.

A particular recording paper which reacts to heat may be used in the thermal printer in which heat is applied to the recording paper using a head to form color so as to allow a letter or a picture to be shown.

Also, the recording paper used in the thermal printer may be so-called linerless recording paper having one surface to which an adhesive is applied.

As shown in the drawings, the recording paper may be present as a roll inside the printing device 100 and then may be withdrawn and transferred while certain information may be printed thereon. However, the present invention is not limited thereto. The recording paper may be present to be folded inside or outside the printing device 100 and may be unfolded and transferred while certain information may be printed thereon.

However, hereinafter, for convenience of description, it will be described as an example that the recording paper is present as a roll inside the printing device 100 and then is withdrawn and transferred while certain information is printed thereon.

Figure 3:
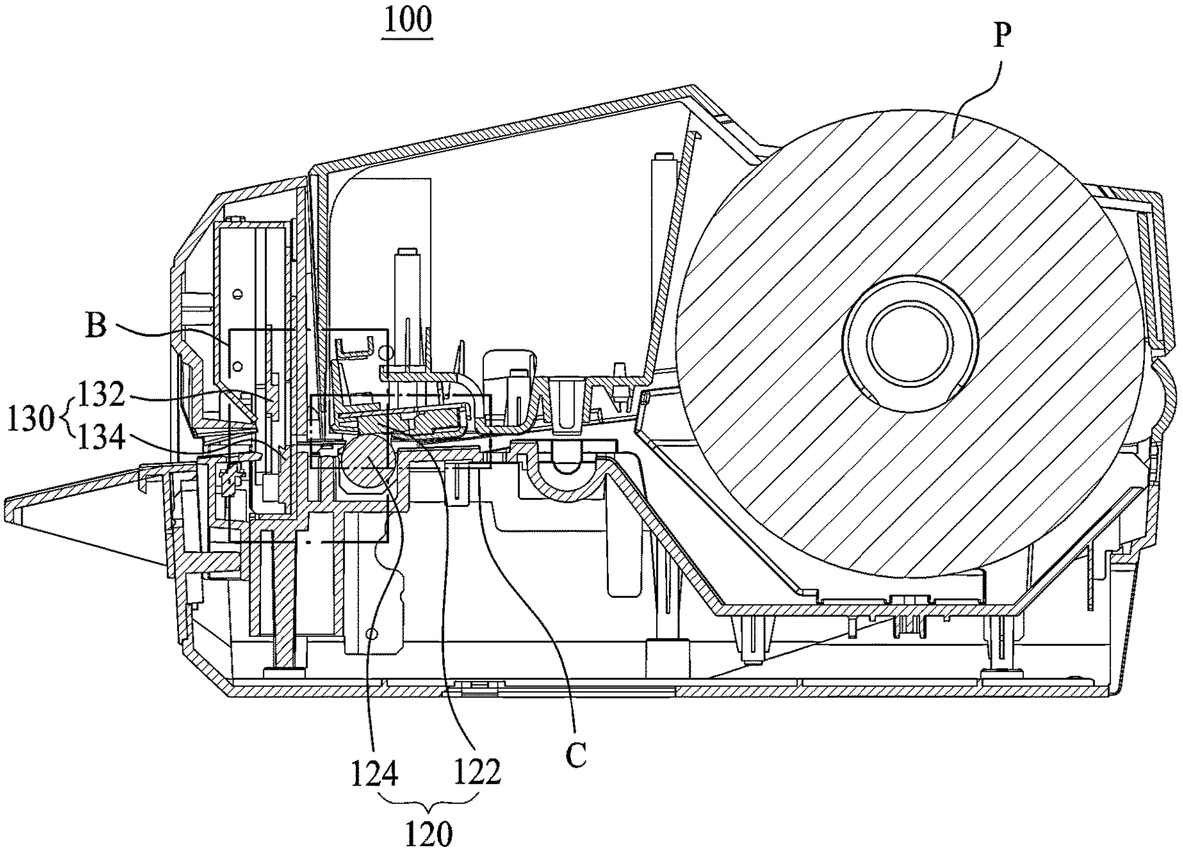
FIG. 3 is a schematic cross-sectional view taken along line AA of FIG. 1.
Figure 4A:
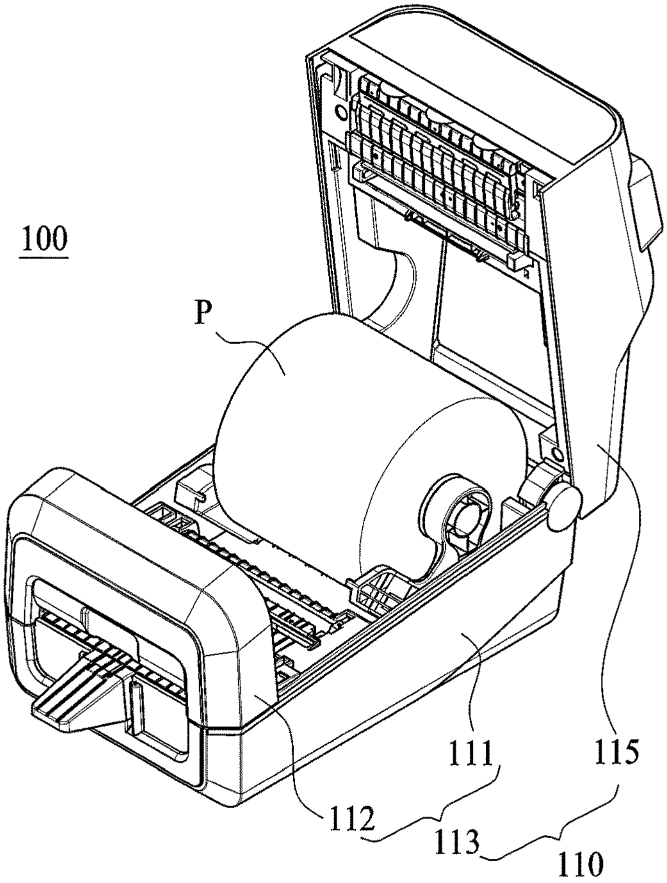
FIGS. 4A and 4B are schematic perspective views illustrating a state in which an opening or closing part included in the printing device according to one embodiment of the present invention is rotated such that an internal space is opened.
Figure 4B:
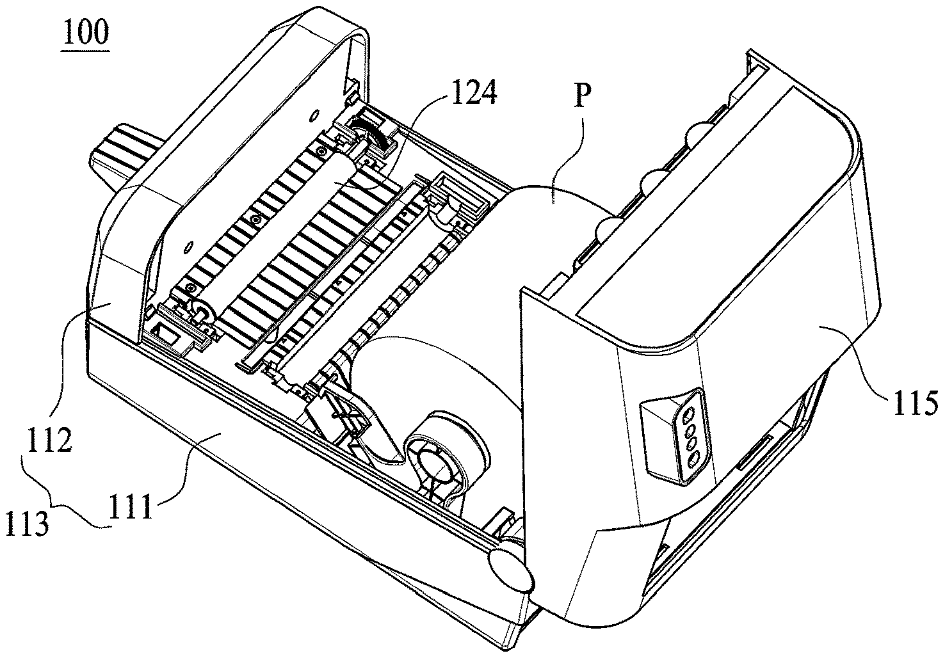

FIG. 3 is a schematic cross-sectional view taken along line AA of FIG. 1, and FIGS. 4A and 4B are schematic perspective views illustrating a state in which an opening or closing part included in the printing device according to one embodiment of the present invention is rotated such that an internal space is opened.

Figure 5:
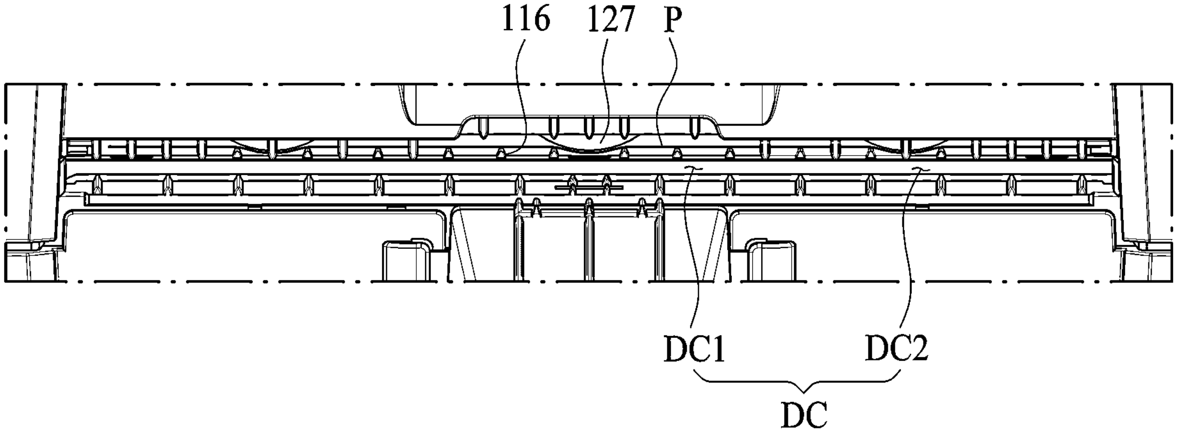
FIG. 5 is a schematic enlarged view illustrating area A of FIG. 2.
Figure 6:
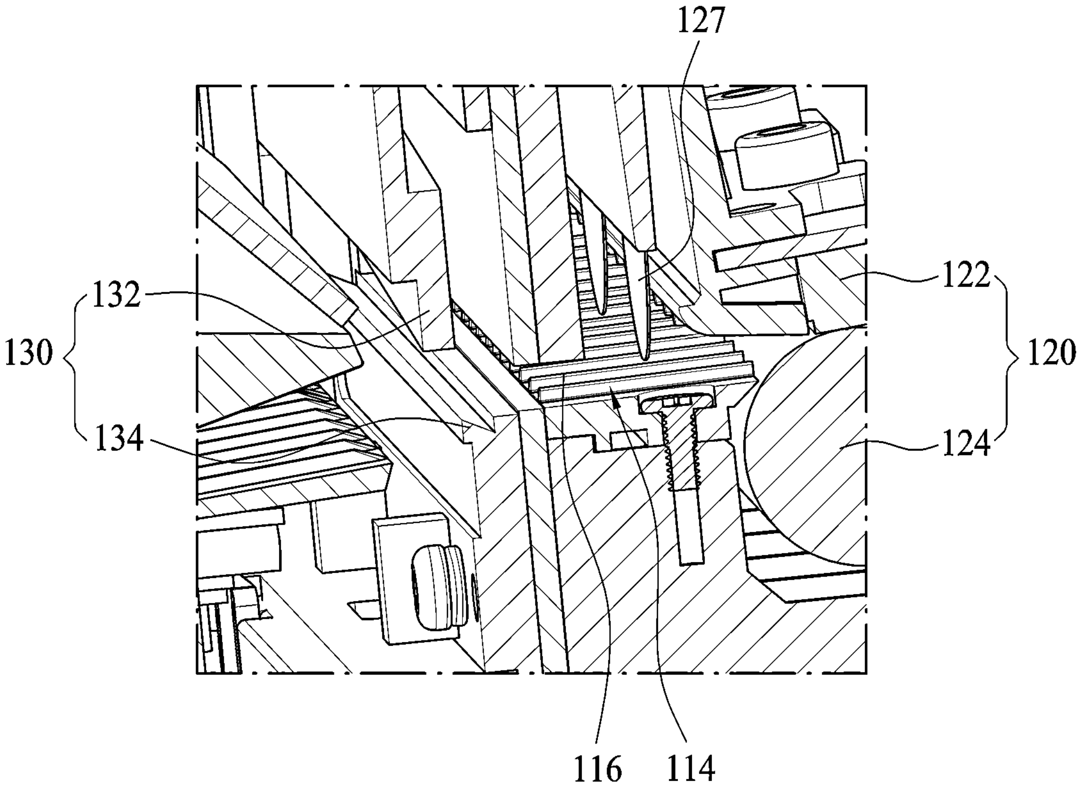
FIG. 6 is a schematic enlarged view illustrating area B of FIG. 3.

Also, FIG. 5 is a schematic enlarged view illustrating area A of FIG. 2, and FIG. 6 is a schematic enlarged view illustrating area B of FIG. 3.

First, when the terms in relation to directions which are used hereafter are defined before a detailed description, an upper stream and a lower stream are concepts relative to each other. On the basis of a direction in which recording paper P is transferred, a position through which the recording paper P passes first after being withdrawn is defined as an upper stream on the basis of a position through which the recording paper P passes later, and the position through which the recording paper P passes later is defined as a lower stream on the basis of the position through which the recording paper P passes first.

Referring to FIGS. 3 to 6, the printing device 100 according to one embodiment of the present invention may include a main body part 110, a printing part 120, a recording paper separation part 130, and the like.

The main body part 110 may include a body part 113 configured to provide an internal space in which the recording paper P for printing certain information thereon is transferred and an opening or closing part 115 configured to control opening or closing of the internal space.

The opening or closing part 115 may be locked up with the body part 113 to close the internal space and may be released to be rotatable on the basis of the body part 113 to open the internal space.

The printing part 120 is a component configured to print certain information on the recording paper P being transferred inside the internal space and may include a head 122 configured to generate heat to print the certain information and a release roller 124 disposed at a position corresponding to the head 122 and configured to transfer the recording paper P.

The release roller 124 may be a roller coated with a release agent or a roller including a release agent to prevent accumulation of an adhesive applied to one surface of the recording paper P.

The release agent may be provided as at least one of rubber, silicone resin, polyvinyl alcohol, paraffin, a variety of types of wax, and the like.

The recording paper separation part 130 may be a component located on a lower stream of the printing part 120 and configured to cut or cut off the recording paper P with particular information printed thereon by the printing part 120 to be separated from the other recording paper P and may include an operating part 132 and a fixing part 134.

The operating part 132 may cut or cut off the recording paper P with the particular information printed thereon which passes through a corresponding position while being moved in a vertical direction on the basis of the fixing part 134 and may be a so-called guillotine type component.

However, the recording paper separation part 130 is not limited to the guillotine type and may be implemented to be a scissors type.

The main body part 110 may be implemented by connection such as fastening of a plurality of components and the like and may include a support guide part 114 configured to support recording paper P with particular information printed thereon during a process in which the recording paper P withdrawn as a rolled sheet is transferred while the particular information is printed thereon by the printing part 120 and is transferred to the recording paper separation part 130 to be separated from the other recording paper P.

The support guide part 114 may be provided between the printing part 120 and the recording paper separation part 130 and may support and guide the recording paper P with the particular information printed thereon.

In detail, the support guide part 114 may support an adhesive surface of the recording paper P with the particular information printed thereon and may include a protruding part 116 configured to prevent an adhesive applied to the adhesive surface from being accumulated by decreasing a contact area with the adhesive surface of the recording paper P.

A plurality of such protruding parts 116 may be formed to be spaced apart from each other along a transfer direction of the recording paper P with the particular information printed thereon and may be a type of ribs.

A distance between the protruding parts 116 is not determined to be a particular numerical value and may vary according to performance of the adhesive applied to the adhesive surface.

However, when the protruding parts 116 are formed to be excessively thick, a phenomenon that the adhesive applied to the adhesive surface is accumulated on the protruding parts 116 may occur. Accordingly, the protruding parts 116 may have a thickness of 0.5 mm to 1.5 mm.

Meanwhile, the main body part 110 may include a pressurizing part 127 configured to prevent a jamming phenomenon by preventing a phenomenon in which an end of the recording paper P with the particular information printed thereon is rolled.

When the end of the recording paper P with the particular information printed thereon is rolled, a rolled part may move into a space inevitably necessary for allowing the operating part 132 of the recording paper separation part 130 to move in a vertical direction. Here, the jamming phenomenon in which the recording paper P is jammed may occur.

However, in the present invention, since the pressurizing part 127 prevents the phenomenon in which the end of the recording paper P with the particular information printed thereon is rolled, a conventional jamming phenomenon and the like may be prevented.

In detail, the recording paper P with the particular information printed thereon passes through a position corresponding to the recording paper separation part 130 while passing through the support guide part 114 to be separated from the other recording paper P by the recording paper separation part 130. Here, the pressurizing part 127 may be disposed toward one side of the support guide part 114 and may pressurize the recording paper P with the particular information printed thereon, which passes through the support guide part 114, to prevent the jamming phenomenon of the recording paper P with the particular information printed thereon by preventing the phenomenon in which the end of the recording paper P with the particular information printed thereon is rolled in one direction.

As shown in FIG. 5, the pressurizing part 127 has a wavy shape when viewed in a direction in which the recording paper P with the particular information printed thereon is transferred, that is, when viewed from an outlet DC through which the recording paper P is discharged so that the phenomenon in which the end of the recording paper P is rolled may be prevented.

In order to prevent the above phenomenon, the pressurizing part 127 may pressurize one area of a surface opposite to the adhesive surface of the recording paper P with the particular information printed thereon which passes through a space between the protruding parts 116.

The pressurizing part 127 may be formed to be rounded when viewed from the direction in which the recording paper P with the particular information printed thereon is transferred, that is, when viewed from the outlet DC through which the recording paper P is discharged. A lowermost point of a rounded part may be located within a range of a height of the protruding part 116.

Accordingly, as described above, since the pressurizing part 127 allows a part pressurized by the pressurizing part 127 to be concavely rounded when the recording paper P is viewed from the outlet DC through which the recording paper P is discharged, the phenomenon in which the end of the recording paper P is rolled may be prevented.

Meanwhile, since the pressurizing part 127 may be mounted on the opening or closing part 115 to operate in connection with the opening or closing part 115, when the internal space is opened due to a change of condition such as rotation or the like of the opening or closing part 115, it is necessary to adjust a degree of pressurizing the recording paper P by remounting the pressurizing part 127 on the opening or closing part 115.

Here, a case in which remounting of the pressurizing part 127 is needed may include a case in which the pressurizing part 127 is worn down or damaged due to a variety of causes, a case in which it is necessary to change the degree of pressurizing the recording paper due to a change in property of the recording paper being used, and the like.

Even when the pressurizing part 127 is not remounted on the opening or closing part 115, the degree of pressurizing may be adjusted corresponding to tension and the like of the recording paper P with the particular information printed thereon. To this end, the pressurizing part 127 may be implemented to have a thickness of 0.1 mm to 1.0 mm using a state-changeable material, for example, polyethylene terephthalate (PET), thermoplastic polyurethane (TPU), polyvinyl chloride (PVC), polyethylene (PE), and/or the like.

When the pressurizing part 127 becomes less than 0.1 mm, a pressurizing force for pressurizing the recording paper P decreases due to an excessive thin thickness such that it is impossible to effectively prevent the phenomenon in which the end of the recording paper P is rolled. When the pressurizing part 127 becomes more than 1.0 mm, it is difficult to change a condition such that a degree of pressurizing the recording paper P is excessively strong, which obstructs smooth transfer of the recording paper P.

Accordingly, the pressurizing part 127 may be implemented to be within a numerical range of the above material and the above thickness to smoothly pressurize the recording paper P and smoothly transfer the recording paper P.

Meanwhile, the pressurizing part 127 is mounted on the opening or closing part 115 and shifts in position in connection with the opening or closing part 115 when the opening or closing part 115 is opened from the body part 113.

Here, since the head 122 of the printing part 120 is mounted on the opening or closing part 115 like the pressurizing part 127, the head 122 shifts in position in connection with the opening or closing part 115.

The head 122 is mounted on the opening or closing part 115 to be shiftable in position thereon due to an elastic member (not shown) such as a spring and the like.

In other words, the head 122 prints a letter or picture on the recording paper P, which is being transferred, due to an interaction with the release roller 124. To this end, when the opening or closing part 115 closes the internal space, it is necessary to pressurize the release roller 124 with an adequate pressurizing force to a certain degree.

To this end, the head 122 is mounted on the opening or closing part 115 to be shiftable in position due to the elastic member.

Accordingly, when the opening or closing part 115 is rotated from the body part 113 and opens the internal space, the head 122 protrudes slightly due to a restoring force of the elastic member.

When the opening or closing part 115 is rotated from the body part 113, the head 122 protrudes to be higher than or equal to the lowermost point of the pressurizing part 127. When the internal space is closed again by the opening or closing part 115, the head 122 shifts in position within a range of the lowermost point of the pressurizing part 127 due to the release roller 124 so as to allow the pressurizing part 127 to pressurize the recording paper P.

Also, a second downstream support part 103 (refer to FIG. 16), which will be described with reference to FIG. 16, may be connected to the head 122 and may be mounted on the opening or closing part 115 to be shiftable in position like the head 122. Accordingly, when the opening or closing part 115 is rotated from the body part 113, the second downstream support part 103 may protrude to be higher than or equal to the lowermost point of the pressurizing part 127. When the internal space is closed by the opening or closing part 115, the second downstream support part 103 shifts in position to be within the range of the lowermost point of the pressurizing part 127 so as to allow the pressurizing part 127 to pressurize the recording paper P.

Figure 7:
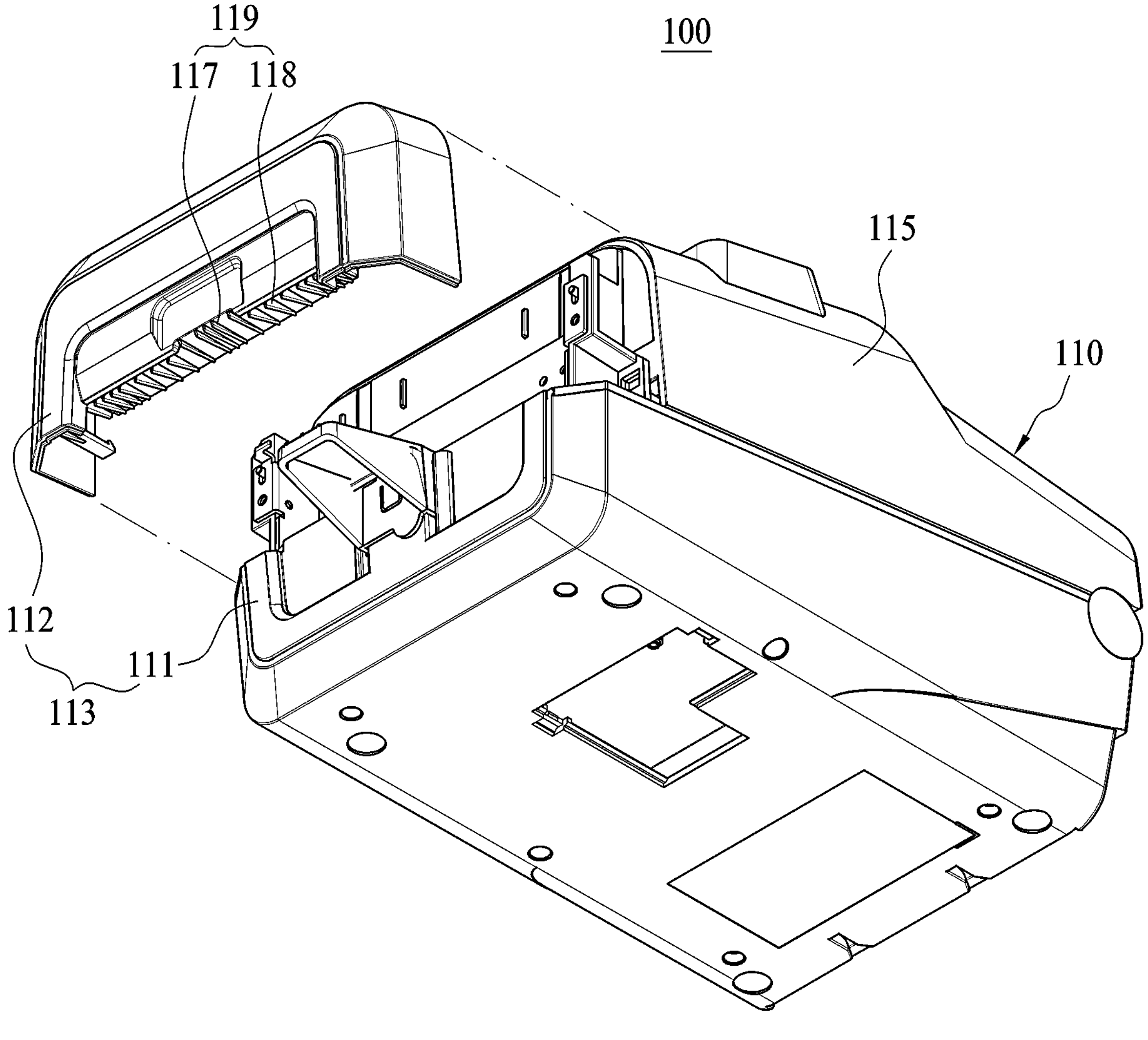
FIG. 7 is a schematic perspective view illustrating the printing device according to one embodiment of the present invention from which a cover part included therein is separated.

FIG. 7 is a schematic perspective view illustrating the printing device according to one embodiment of the present invention from which a cover part included therein is separated.

Referring to FIG. 7, the printing device 100 according to one embodiment of the present invention may include the main body part 110 including the body part 113 and the opening or closing part 115 as described above with reference to FIGS. 1 to 6.

The body part 113 may include a frame part 111 configured to provide an overall exterior of the printing device 100 according to one embodiment of the present invention and a cover part 112 mounted on the frame part 111 to cover the recording paper separation part 130 and configured to provide the outlet DC to allow the recording paper P with the particular information printed thereon by the printing part 120 to be discharged outward.

The cover part 112 may be detachably mounted on the frame part 111 and may include a protruding part 119 to prevent the adhesive attached to the surface opposite the adhesive surface of the recording paper P from being accumulated.

Hereinafter, the protruding part 119 and a reason that the adhesive is attached to the surface opposite the adhesive surface of the recording paper P will be described in detail. Here, it should be noted that the protruding part 119 is a component formed at a position different from that of the protruding part 116 described above with reference to FIGS. 1 to 6.

Figure 8:
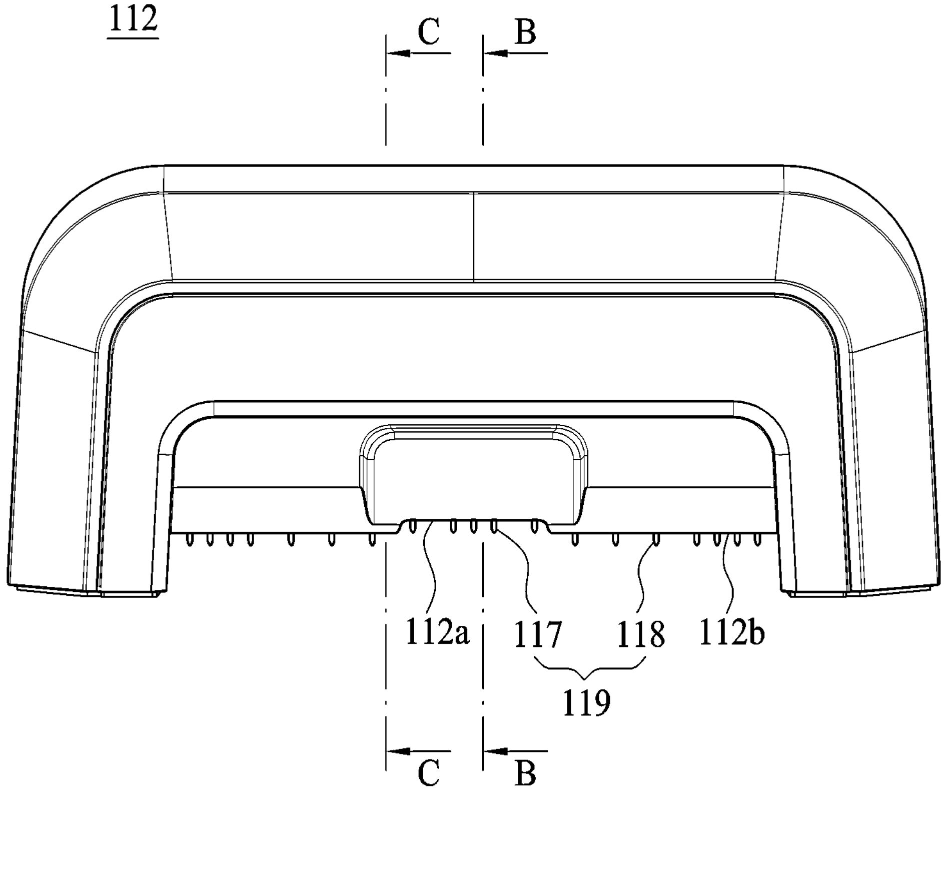
FIG. 8 is a schematic front view illustrating the cover part included in the printing device according to one embodiment of the present invention.
Figure 9:
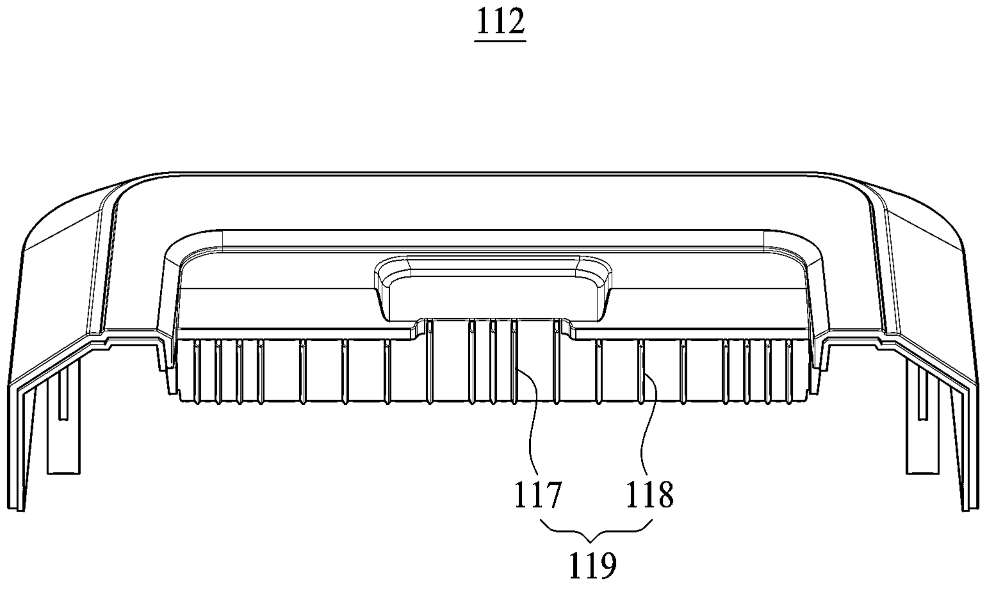
FIG. 9 is a schematic bottom perspective view illustrating the cover part included in the printing device according to one embodiment of the present invention.

FIG. 8 is a schematic front view illustrating the cover part included in the printing device according to one embodiment of the present invention, and FIG. 9 is a schematic bottom perspective view illustrating the cover part included in the printing device according to one embodiment of the present invention.

Figure 10A:
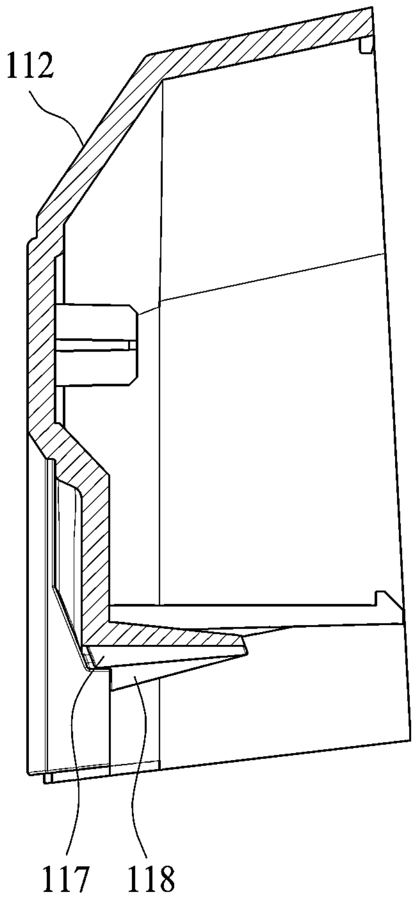
FIGS. 10A and 10B are schematic cross-sectional views taken along line BB of FIG. 8.
Figure 10B:
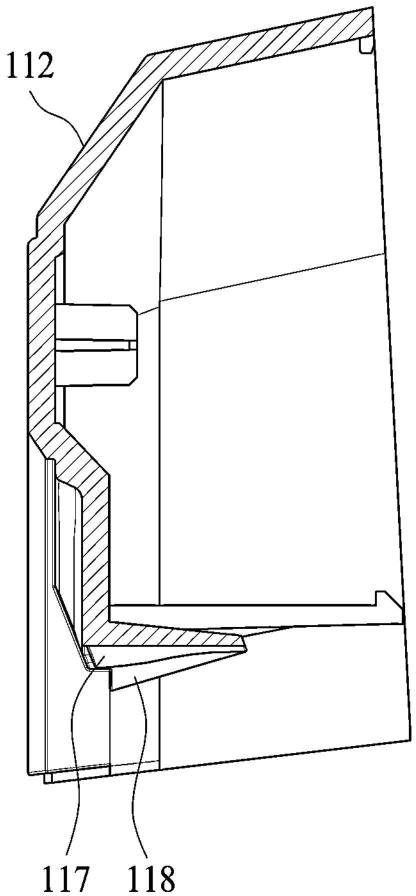
Figure 11A:
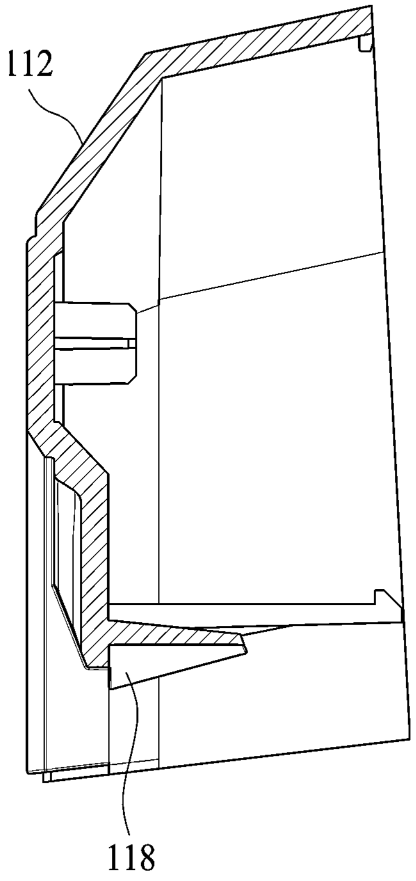
FIGS. 11A and 11B are schematic cross-sectional views taken along line CC of FIG. 8.
Figure 11B:
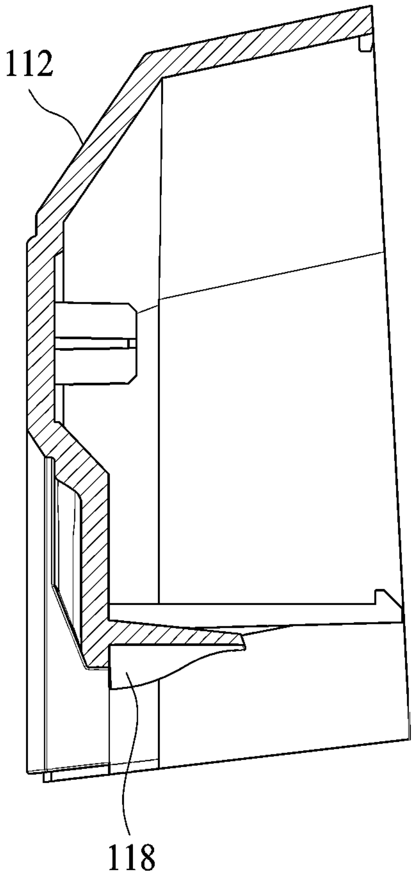

Also, FIGS. 10A and 10B are schematic cross-sectional views taken along line BB of FIG. 8, and FIGS. 11A and 11B are schematic cross-sectional views taken along line CC of FIG. 8.

Referring to FIGS. 8 to 11B, the cover part 112 may include the protruding part 119 configured to prevent the adhesive attached to the surface opposite the adhesive surface from accumulating while the recording paper P with the particular information printed thereon by the printing part 120 is discharged outward through the outlet DC.

Here, a phenomenon in which the adhesive is attached to the surface opposite the adhesive surface of the recording paper P relates to the recording paper P being provided as the roll.

That is, since the recording paper P is provided as the roll, the surface opposite the adhesive surface is inevitably provided to come into contact with the adhesive surface. Accordingly, the surface opposite the adhesive surface of the recording paper P may be withdrawn and transferred while the adhesive applied to the adhesive surface is placed thereon.

Although the surface opposite the adhesive surface is coated, it is impossible to completely prevent the adhesive from being placed thereon through coating.

Accordingly, the printing device 100 according to one embodiment of the present invention includes components configured to prevent the adhesive from being accumulated on a component coming into contact with the surface opposite the adhesive surface, and the protruding part 119 is one of the components.

A plurality of such protruding parts 119 may be formed to be spaced apart from each other along a discharge direction of the recording paper P with the particular information printed thereon and may be a type of rib.

The cover part 112 may include a first outlet providing part 112*a* configured to provide a first outlet DC1 to allow recording paper having a first width to be discharged therethrough among such outlets DC and a second outlet providing part 112*b* configured to allow recording paper having a second width different from the first width to be discharged.

For example, the second width may be greater than the first width. The first width may be 1.5 inches, and the second width may be 4 inches.

The first outlet providing part 112*a* may be present in the second outlet providing part 112*b*.

The first outlet providing part 112*a* may be provided so that a vertical height of the first outlet DC1 is higher than a vertical height of the second outlet DC2. This is to allow a user to grip and withdraw the recording paper having the first width and with particular information printed thereon by partially inserting his or her finger thereinto.

In other words, when the first width is 1.5 inches, a length of the recording paper with the particular information printed thereon which is cut or cut off by the recording paper separation part 130 is generally small such that the user may have a difficulty in easily gripping a discharged part of the recording paper discharged through the first outlet DC1.

Due to the above reason, in the case of the recording paper having the first width, a case in which the user should insert a finger into the first outlet DC1 to grip and withdraw the recording paper may occur. To this end, the first outlet providing part 112*a* is provided so that the vertical height of the first outlet DC1 is higher than the vertical height of the second outlet DC2.

Meanwhile, such protruding parts 119 may be formed on the first outlet providing part 112*a* and the second outlet providing part 112*b*. A gap between protruding parts 117 formed on the first outlet providing part 112*a* may be formed to be greater at both side parts than at a central part so as to allow the user to easily insert his or her finger thereinto.

The protruding parts 117 formed on the first outlet providing part 112*a* may be formed to be tilted downward along a direction in which the recording paper with the particular information printed thereon is discharged as shown in FIG. 10A. Accordingly, a phenomenon in which an end of the recording paper having the first width and with the particular information printed thereon is rolled in one direction may be prevented and the end may be prevented from being inserted into a space SS1 (refer to FIG. 12) for operations of the recording paper separation part 130.

Although an end of the recording paper having the first width and with the particular information printed thereon may be rolled in one direction due to material properties and/or the roll shape, the end may be prevented from being rolled while sliding along the first outlet providing part 112*a* formed to be tilted downward along the discharge direction as well as being inserted into the space SS1 for operations of the recording paper separation part 130.

Also, the protruding part 117 formed on the first outlet providing part 112*a* may be formed to be tilted downward along the discharge direction of the recording paper with the particular information printed thereon while being rounded to have an inflection point as shown in FIG. 10B.

When the protruding part 117 is formed to be rounded to have the inflection point, the end may come into contact therewith and may be smoothly slidable so as to prevent the recording paper having the first width and with the particular information printed thereon from being jammed while being transferred as well as preventing the end from being rolled.

Also, when the protruding part 117 is formed to be rounded to have an inflection point, a space between the first outlet providing part 112*a* and one surface SF (refer to FIG. 15) of the frame part 111 which face each other is secured so as to provide smooth transfer of the recording paper having the first width and with the particular information printed thereon.

Meanwhile, protruding parts 118 formed on the second outlet providing part 112*b* may have a smaller gap at both side parts than a gap at another part so that both ends of an end of the recording paper having the second width and with particular information printed thereon may be prevented from being rolled and inserted into a gap space therebetween.

In other words, the protruding parts 118 formed on the second outlet providing part 112*b* may have a smaller gap formed at both side parts than a gap at another part so as to form a small gap space. Accordingly, even when both ends of the end of the recording paper having the second width and with the particular information printed thereon are rolled slightly, the end may not be inserted into the small gap space.

Also, although not shown in the drawings, the protruding parts 118 formed on the second outlet providing part 112*b* are formed to have the gaps smaller than or equal to the gaps of the protruding parts 117 formed on the first outlet providing part 112*a* so that both ends of the end of the recording paper with the particular information printed thereon may be prevented from being rolled and inserted into the gap space.

The protruding part 118 formed on the second outlet providing part 112*b* may be formed to be tilted downward along the discharge direction of the recording paper with the particular information printed thereon as shown in FIG. 11A so as to prevent the end of the recording paper with the particular information printed thereon from being rolled in one direction as well as being inserted into the space SS1 for operations of the recording paper separation part 130. Also, since the above reason is equal to the protruding part 117 formed on the first outlet providing part 112*a* formed to be tilted downward along the discharge direction of the recording paper shown in FIG. 10A, a detailed description thereof will be omitted.

Also, the protruding part 118 formed on the second outlet providing part 112*b* may be formed to be tilted downward along the discharge direction of the recording paper with the particular information printed thereon while being rounded to have an inflection point as shown in FIG. 11B. Since an effect thereof is equal to that of the protruding part 117 formed on the first outlet providing part 112*a* shown in FIG. 10B, a detailed description thereof will be omitted.

Figure 12:
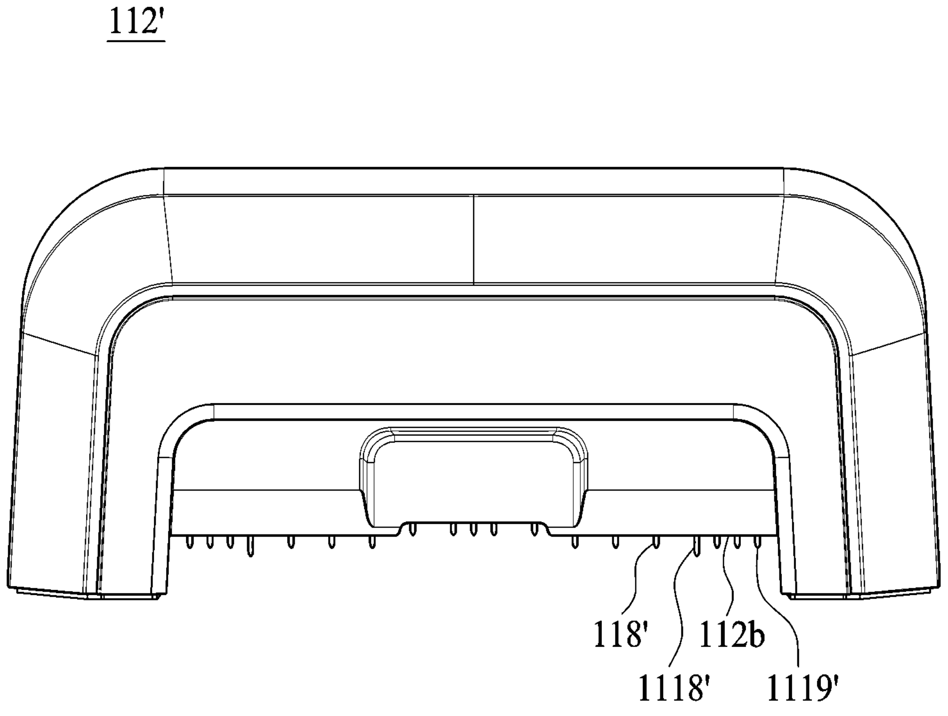
FIG. 12 is a schematic front view illustrating a first modified example of the cover part included in the printing device according to one embodiment of the present invention.
Figure 13:
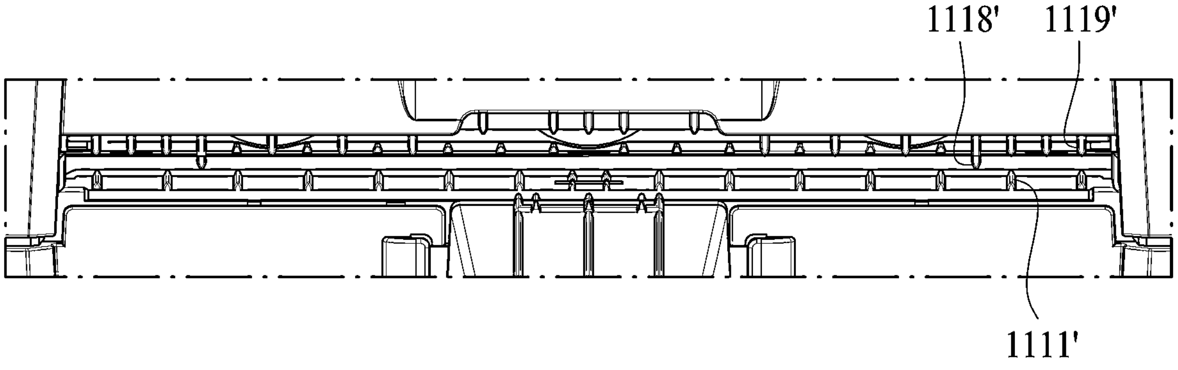
FIG. 13 is a schematic enlarged view illustrating area A of FIG. 2 to which the first modified example of the cover part is applied.

FIG. 12 is a schematic front view illustrating a first modified example of the cover part included in the printing device according to one embodiment of the present invention, and FIG. 13 is a schematic enlarged view illustrating area A of FIG. 2 to which the first modified example of the cover part is applied.

Referring to FIGS. 12 and 13, since a cover part 112' according to the first modified example has components and effects which are equal to those of the cover part 112 described above with reference to FIGS. 8 to 11 excluding a protruding part 118' formed on a second outlet providing part 112*b*', a description in addition to that of the protruding part 118' formed on the second outlet providing part 112*b*' will be omitted.

Such protruding parts 118' formed on the second outlet providing part 112*b*' may unevenly protrude toward the one surface SF of the frame part 111 facing the second outlet providing part 112*b*'.

For example, at least one of the protruding parts 118' formed on the second outlet providing part 112*b*' may protrude further toward the one surface SF of the frame part

111, which faces the second outlet providing part 112*b*', than other protruding parts 118'. At least one of the protruding parts 118' formed on both side parts may correspond thereto as shown in the drawing.

A protruding part 1118' protruding further may be at least one protruding part located inward from a protruding part 1119' located outermost among the protruding parts 118' formed on the second outlet providing part 112*b*'. Accordingly, since an interior between both ends of the end of the recording paper with the particular information printed thereon is relatively further pressurized, it is possible to effectively prevent both ends from being rolled and inserted into a space therebetween.

Meanwhile, the protruding part 1118' protruding further may be located between protruding parts 1111' formed on the one surface SF of the frame part 111, which faces the second outlet providing part 112*b*', so that a space configured to secure smooth transfer of the recording paper with the particular information printed thereon is provided.

Figure 14:
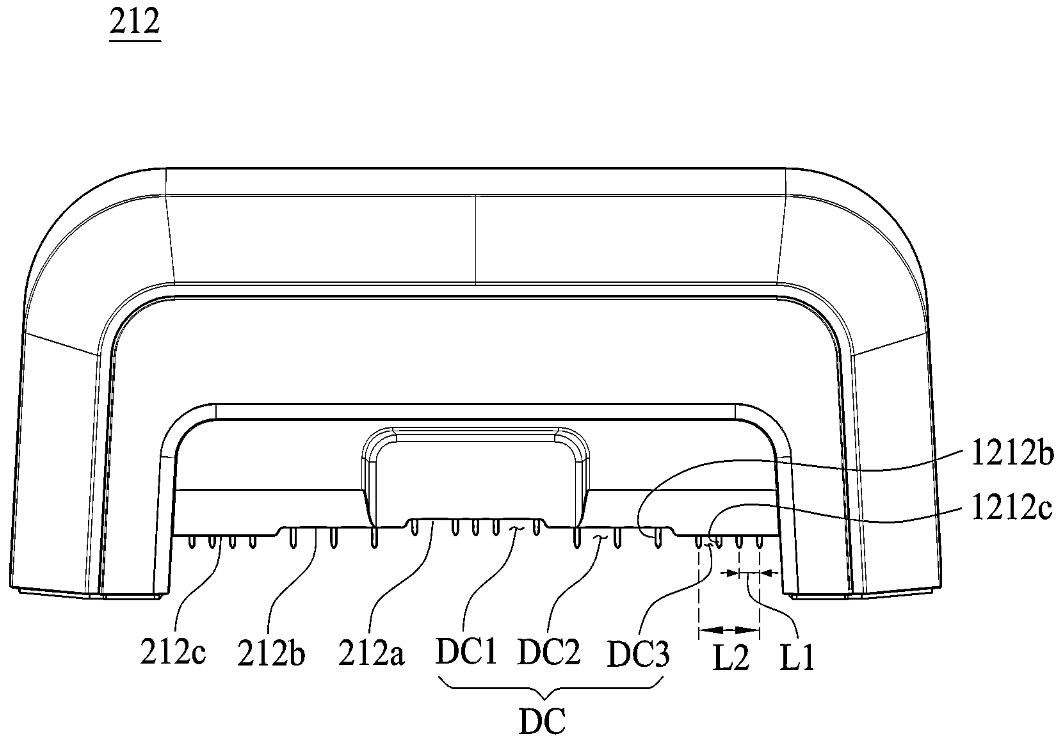
FIG. 14 is a schematic front view illustrating a second modified example of the cover part included in the printing device according to one embodiment of the present invention.

FIG. 14 is a schematic front view illustrating a second modified example of the cover part included in the printing device according to one embodiment of the present invention.

Referring to FIG. 14, a cover part 212 according to the second modified example may include a first outlet providing part 212*a* configured to provide a first outlet DC1 to discharge recording paper having a first width therethrough among outlets DC, a second outlet providing part 212*b* configured to provide a second outlet DC2 to discharge recording paper having a second width greater than the first width, and a third outlet providing part 212*c* configured to provide a third outlet DC3 to discharge recording paper having a third width greater than the second width.

Here, the second outlet providing part 212*b* may be present inward from the third outlet providing part 212*c*, and the first outlet providing part 212*a* may be present inward from the second outlet providing part 212*b* and the third outlet providing part 212*c*.

The first outlet providing part 212*a* may be provided so that a vertical height of the first outlet DC1 is higher than a vertical height of the second outlet DC2. This is to allow a user to grip and withdraw the recording paper having the first width and with particular information printed thereon by partially inserting a finger thereinto.

Also, the second outlet providing part 212*b* may be provided so that the vertical height of the second outlet DC2 is higher than a vertical height of the third outlet DC3. This is to allow the user to grip and withdraw the recording paper having the second width and with the particular information printed thereon by partially inserting his or her finger.

Meanwhile, a gap between protruding parts 1212*c* formed on the third outlet providing part 212*c* may be smaller than that of protruding parts 1212*b* formed on the second outlet providing part 212*b* so that both ends of an end of the recording paper having the third width may be prevented from being rolled and inserted into a space therebetween.

Here, a gap distance L1 between the protruding parts 1212*c* formed on the third outlet providing part 212*c* may be within a range from 0.3 mm to 0.6 mm.

When the gap distance L1 is less than 0.3 mm, the gap is excessively small such that a probability of manufacturing defects caused by injection molding increases.

Also, when the gap distance L1 is less than 0.3 mm, the number of the protruding parts 1212*c* increases such that accumulation of an adhesive occurs due to an increase in contact area with a surface opposite an adhesive surface of recording paper.

When the gap distance is more than 0.6 mm, a probability that the end of the recording paper is rolled and inserted into a gap space is increased such that a problem may occur in smooth transfer of the recording paper.

Meanwhile, a distance L2 between a protruding part formed innermost and a protruding part formed outermost among the protruding parts 1212*c* formed on the third outlet providing part 212*c* may be within a range from 0.9 mm to 18 mm.

When the distance L2 is less than 0.9 mm, a limitation is present in an applicable range of the recording paper having the third width such that there is a problem that an applicable range of the printing device according to one embodiment of the present invention decreases. When the distance L2 is more than 1.8 mm, the number of the protruding parts 1212*c* increases by the same amount so that the accumulation of the adhesive or the like may occur due to an increase in contact area with the surface opposite the adhesive surface of the recording paper.

Meanwhile, it should be noted that the components in relation to the gap distance L1 and the distance L2 which are described above are equally applicable to the protruding parts 118 formed on the second outlet providing part 112*b* described with reference to FIGS. 8 to 11.

Figure 15:
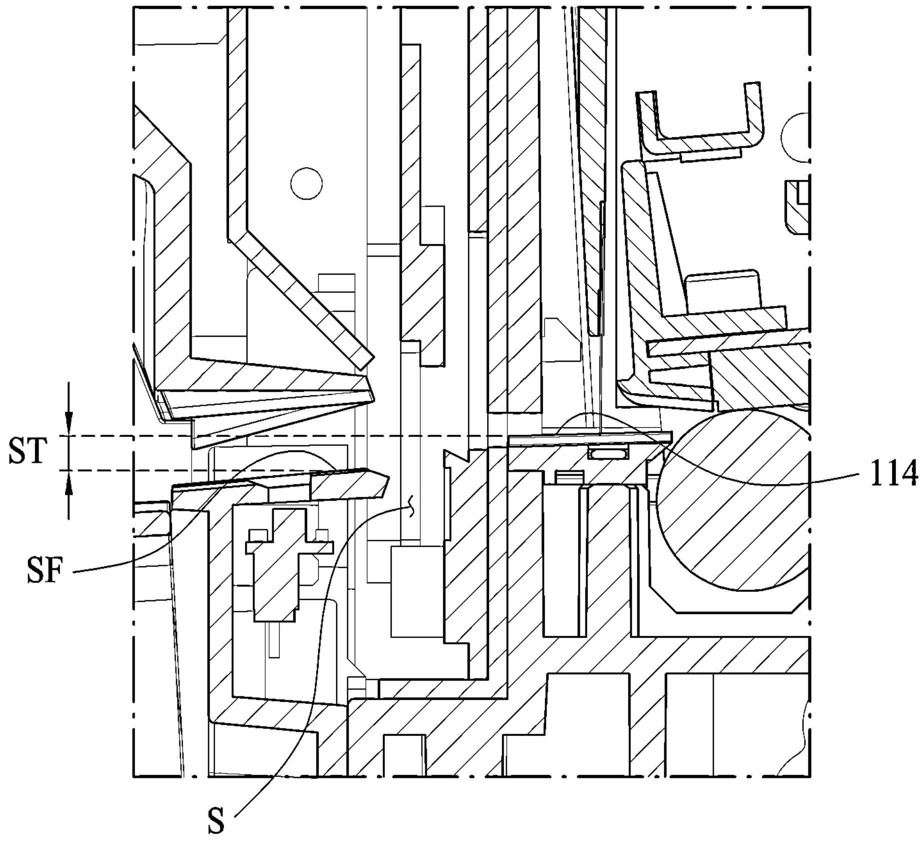
FIG. 15 is a schematic enlarged cross-sectional view illustrating area B of FIG. 3.

FIG. 15 is a schematic enlarged view illustrating area B of FIG. 3.

Referring to FIG. 15, the one surface SF of the frame part 111 which faces the first outlet providing part 112*a* and the second outlet providing part 112*b* may have a stepwise height ST in comparison to one surface of the support guide part 114 which supports the recording paper with the particular information printed thereon.

Accordingly, it is possible to prevent the end of the recording paper with the particular information printed thereon from being rolled in one direction and inserted into a requisite space SS2 for operations of the recording paper separation part 130 while the recording paper with the particular information printed thereon is transferred toward the recording paper separation part 130 to be separated from other recording paper.

When the stepwise height ST is not implemented and an even height is implemented, the end of the recording paper with the particular information printed thereon which is rolled in one direction is increasingly insertable into the requisite space SS2 such that a jamming phenomenon may be caused.

The stepwise height ST may be formed to be within a range from 1 mm to 10 mm. When the stepwise height ST is less than 1 mm, a probability that the end of the recording paper with the particular information printed thereon is insertable into the requisite space SS2 increases. When the stepwise height is more than 10 mm, a space in which the end of the recording paper with the particular information printed thereon is autonomously rolled is provided such that it is impossible to smoothly transfer the recording paper with the particular information printed thereon while being unfolded.

When the stepwise height ST is more than 10 mm, a space between the frame part 111 and the first outlet providing part 112*a* and the second outlet providing part 112*b* increases so as to function as the space in which the end of the recording paper with the particular information printed thereon rolls itself. Accordingly, the stepwise height ST may be formed to be 10 mm or less.

Figure 16:
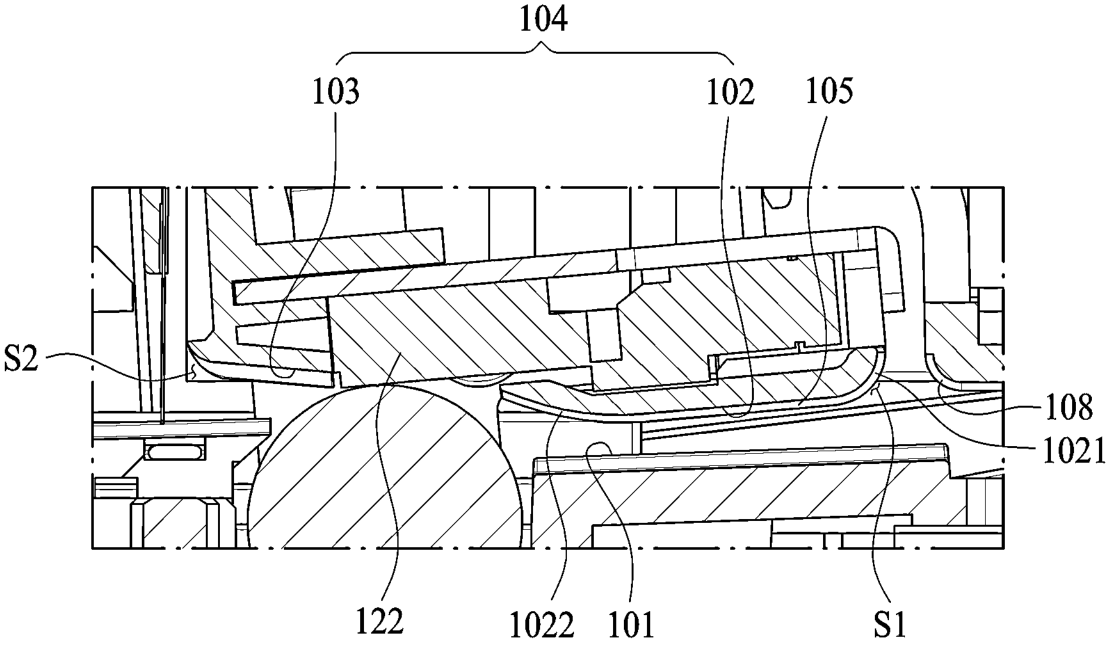
FIG. 16 is a schematic enlarged cross-sectional view illustrating area C of FIG. 3.

FIG. 16 is a schematic enlarged cross-sectional view illustrating area C of FIG. 3.

Referring to FIG. 16 with the previous drawings, the main body part 110 may include a first support part 101 configured to support an adhesive surface of recording paper while being transferred in the internal space and may include a second support part 104 and a third support part 108 which are configured to support a surface opposite the adhesive surface.

Here, the second support part 104 may include a protruding part 105 configured to prevent an adhesive attached to the surface opposite the adhesive surface from being accumulated by decreasing a contact area with the surface opposite the adhesive surface.

A plurality of such protruding parts 105 may be formed to be spaced apart from each other along a transfer direction of the recording paper P with particular information printed thereon and may be a type of rib.

A distance between the protruding parts 105 is not determined to be a particular numerical value and may vary according to performance of the adhesive applied to the adhesive surface.

However, when the protruding parts 105 are formed to be excessively thick, a phenomenon is caused in which the adhesive applied to the adhesive surface is accumulated on the protruding parts 105. On the other hand, when the protruding parts 105 are formed to be excessively thin, a coating agent coated on the surface opposite the adhesive surface is continuously worn down such that a line may be formed. Accordingly, the protruding parts 105 may have a thickness of 0.5 mm to 1.5 mm.

Meanwhile, it should be noted that the protruding parts 105 is a component at a position different from positions of the protruding parts 116 and 119 described in the above embodiment.

The second support part 104 may include a second upstream support part 102 and the second downstream support part 103 which are located upstream and downstream, respectively, on the basis of the head 122, respectively.

Here, the protruding parts 105 may be formed on at least one of the second upstream support part 102 and the second downstream support part 103.

The second upstream support part 102 may include a rounded or tetrahedral upstream end 1021 to provide a space S1 configured to allow the adhesive attached to the surface opposite the adhesive surface while the recording paper is transferred to be accumulated therein. The recording paper comes into contact with a boundary part of the upstream end 1021 while being transferred. Here, the adhesive attached to the opposite surface is accumulated in the space S1 so that the adhesive is not accumulated on other components so as to prevent printing performance from being degraded.

Here, since accumulation of the adhesive attached to the opposite surface may increase as an area of the upstream end 1021 which comes into contact with the opposite surface of the recording paper increases, the upstream end 1021 may be a non-formation area in which the protruding parts 105 are not formed.

In other words, the protruding parts 105 may be formed on at least a part of the second upstream support part 102.

Meanwhile, the second upstream support part 102 may be coated with a release agent provided as at least one material of rubber, silicone resin, polyvinyl alcohol, paraffin, a variety of types of wax, and the like so as to minimize accumulation of the adhesive attached to the opposite surface.

In order to minimize accumulation of the adhesive attached to the opposite surface, the second upstream support part 102 may be implemented to have a surface bonded with a tape including a release ingredient in addition to the above-described method of coating with the release agent. In this case, the upstream end 1021 may be an area in which a surface is not bonded with the tape including the release ingredient, which may include at least one of rubber, silicone resin, polyvinyl alcohol, paraffin, a variety of types of wax, and the like.

Also, the second upstream support part 102 may be implemented as a material naturally including a release agent, which may include at least one of rubber, silicone resin, polyvinyl alcohol, paraffin, a variety of types of wax, and the like. In this case, the upstream end 1021 may be implemented as a material excluding the release agent.

Here, since the upstream end 1021 is an area in which accumulation of the adhesive is needed, the upstream end 1021 may be a non-coated area not coated with the release agent, an area in which a surface is not bonded with the tape including the release ingredient, or an area including a material excluding the release ingredient. This may mean that an area coated with the release agent, an area in which a surface is bonded with the tape including the release ingredient, or an area implemented as a material including the release ingredient may be a part of the second upstream support part 102.

In addition to being coated with the release agent, the second upstream support part 102 may be formed to be coarse through corrosion or the like to minimize accumulation of the adhesive attached to the opposite surface so that micro unevenness may be formed on a surface thereof and a degree of surface roughness of the surface may be high.

However, since the upstream end 1021 is a part in which accumulation of the adhesive is needed, the upstream end 1021 may be an area formed not to be coarse and an area formed to be coarse may be a part of the second upstream support part 102.

Meanwhile, the upstream end 1021 may have a lowermost point configured to support the opposite surface and located lower than a lowermost point of the third support part 108 and a lowermost point of the head 122, which are further upstream than the upstream end 1021, so as to easily accumulate the adhesive attached to the opposite surface in the space S1.

Accordingly, a degree of coming into contact with the boundary part of the upstream end 1021 increases while the recording paper is transferred so that a possibility that the adhesive attached to the opposite surface is accumulated in the space S1 increases more.

A downstream end 1022 of the second upstream support part 102 may have a round shape or a tetrahedral shape to provide a space S2 for allowing the adhesive attached to the surface opposite the adhesive surface of each sheet of the other recording paper to be accumulated while the recording paper is cut or cut off by the recording paper separation part 130 and the other recording paper is backfed. Here, backfeeding means transferring to the internal space after cutting or cutting off the recording paper to minimize a blank space of the recording paper.

The other of recording paper comes into contact with a boundary part of the downstream end 1022 while being backfed. Here, the adhesive attached to a surface opposite an adhesive surface of each other sheet of recording paper is accumulated in the space S2 so that the adhesive is not accumulated on other components so as to prevent printing performance from being degraded.

Here, since accumulation of the adhesive attached to the opposite surface may increase as an area of the downstream end 1022 which comes into contact with the opposite surface of the recording paper increases, the downstream end 1022 may be a non-formation area in which the protruding parts 105 are not formed.

In other words, the protruding parts 105 may be formed on only at least a part of the second upstream support part 102.

Meanwhile, as described above, the second upstream support part 102 may be coated with a release agent provided as at least one material of rubber, silicone resin, polyvinyl alcohol, paraffin, a variety of types of wax, and the like so as to minimize accumulation of the adhesive attached to the opposite surface, may have a surface bonded with a tape including a release ingredient, or may be formed of a material including the release agent.

However, since the downstream end 1022 is an area in which accumulation of the adhesive is needed, the downstream end 1022 may be a non-coated area not coated with the release agent, an area in which a surface is not bonded with the tape including the release agent ingredient, or an area including a material excluding the release agent ingredient. This may mean that an area coated with the release agent, an area in which a surface is bonded with the tape including the release ingredient, or an area implemented as a material including the release ingredient may be a part of the second upstream support part 102.

In addition to being coated with the release agent, being bonded with the tape including the release ingredient, or being implemented as a material including the release ingredient, the second upstream support part 102 may be formed to be coarse through corrosion or the like to minimize accumulation of the adhesive attached to the opposite surface so that micro unevenness may be formed on a surface thereof and a degree of surface roughness of the surface may be high.

However, since the downstream end 1022 is a part in which accumulation of the adhesive is needed, the downstream end 1022 may be an area formed not to be coarse and an area formed to be coarse may be a part of the second upstream support part 102.

Meanwhile, the downstream end 1022 may have a lowermost point configured to support the opposite surface and located lower than a lowermost point of the third support part 108 and a lowermost point of the head 122, which are further upstream than the upstream end 1021, so as to easily accumulate the adhesive attached to the opposite surface in the space S2.

Accordingly, a degree of coming into contact with the boundary part of the downstream end 1022 increases while the recording paper is backfed so that a possibility that the adhesive attached to the opposite surface is accumulated in the space S2 increases more. On the other hand, the degree of coming into contact with the boundary part of the downstream end 1022 increases even while the recording paper is fed forward so that a possibility that the adhesive attached to the opposite surface is accumulated on an upstream side of the downstream end 1022 increases.

A downstream end 1032 of the second downstream support part 103 may have a round shape or tetrahedral shape to provide a space S3 for allowing the adhesive attached to the surface opposite the adhesive surface of the other sheet of the recording paper to be accumulated therein while the recording paper is cut or cut off by the recording paper separation part 130 and the other recording paper is backfed.

The other recording paper comes into contact with a boundary part of the downstream end 1032 while being backfed. Here, the adhesive attached to a surface opposite an adhesive surface of each other sheet of recording paper is accumulated in the space S3 so that the adhesive is not accumulated on other components so as to prevent printing performance from being degraded.

Here, since accumulation of the adhesive attached to the opposite surface may increase as an area of the downstream end 1032 which comes into contact with the opposite surface of the recording paper increases, the downstream end 1032 may be a non-formation area in which the protruding parts 105 are not formed.

In other words, the protruding parts 105 may be formed on at least a part of the second downstream support part 103.

Meanwhile, the second downstream support part 103 may be coated with a release agent provided as at least one material of rubber, silicone resin, polyvinyl alcohol, paraffin, a variety of types of wax, and the like so as to minimize accumulation of the adhesive attached to the opposite surface.

In order to minimize accumulation of the adhesive attached to the opposite surface, the second downstream support part 103 may be implemented to have a surface bonded with a tape including a release ingredient in addition to the above-described method of coating with the release agent. In this case, the downstream end 1032 may be an area in which a surface is not bonded with the tape including the release ingredient, which may include at least one of rubber, silicone resin, polyvinyl alcohol, paraffin, a variety of types of wax, and the like.

Also, the second upstream support part 102 may be implemented as a material naturally including a release agent, which may include at least one of rubber, silicone resin, polyvinyl alcohol, paraffin, a variety of types of wax, and the like. In this case, the upstream end 1021 may be implemented as a material excluding the release agent.

However, since the downstream end 1032 is an area in which accumulation of the adhesive is needed, the downstream end 1032 may be a non-coated area not coated with the release agent, an area in which a surface is not bonded with the tape including the release agent ingredient, or an area including a material excluding the release agent ingredient. This may mean that an area coated with the release agent, an area in which a surface is bonded with the tape including the release ingredient, or an area implemented as a material including the release ingredient may be a part of the second downstream support part 103.

In addition to being coated with the release agent, being bonded with the tape including the release ingredient, or being implemented as a material including the release ingredient, the second downstream support part 103 may be formed to be coarse through corrosion or the like to minimize accumulation of the adhesive attached to the opposite surface so that micro unevenness may be formed on a surface thereof and a degree of surface roughness of the surface may be high.

However, since the downstream end 1032 is a part in which accumulation of the adhesive is needed, the downstream end 1032 may be an area formed not to be coarse and an area formed to be coarse may be a part of the second downstream support part 103.

Meanwhile, in order to prevent the adhesive attached to the surface opposite the adhesive surface from being accumulated while the recording paper is transferred in the internal space, the head 122 of the printing part 120 may be at least partially coated with the above-described release agent, may be bonded with the tape including the release ingredient, or may be implemented as the material including the release ingredient. An area in addition to a heating line may be implemented to be coated with the release agent, bonded with the tape including the release ingredient, or be implemented as the material including the release ingredient.

A non-coating method with respect to the heating line may be implemented using a variety of masking materials such as a masking tape and the like and a variety of masking methods.

Figure 17:
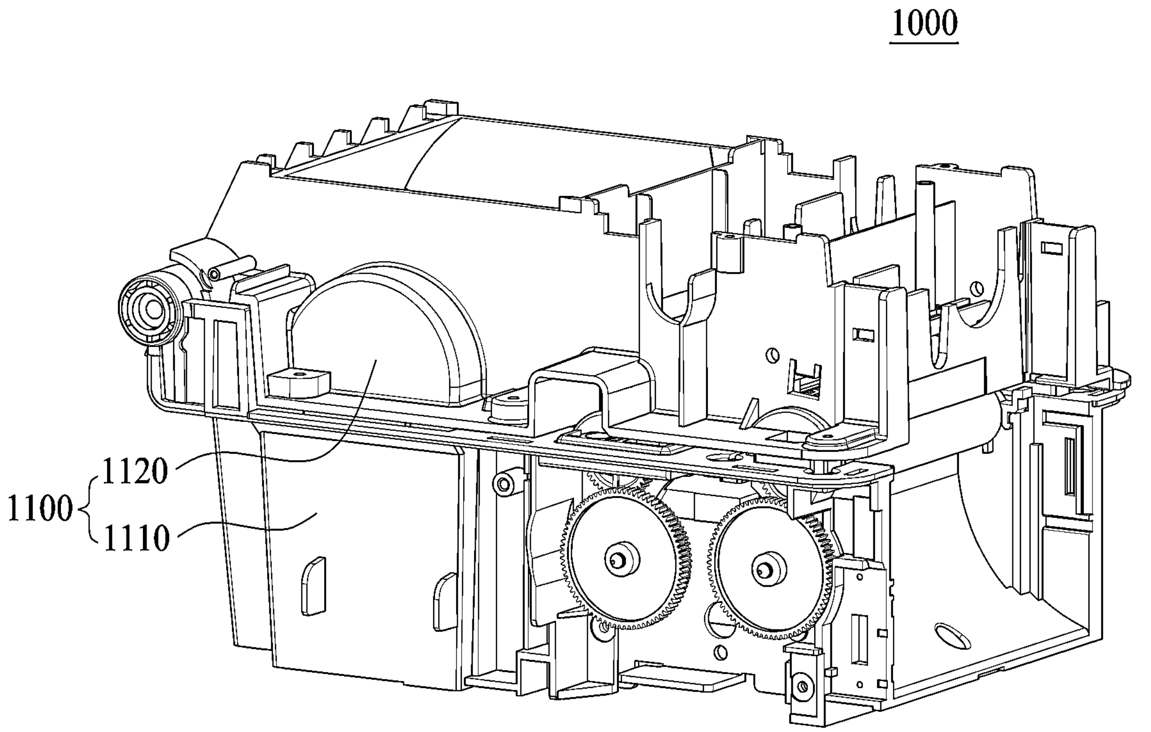
FIG. 17 is a schematic internal view illustrating a printing device according to another embodiment of the present invention.
Figure 18:
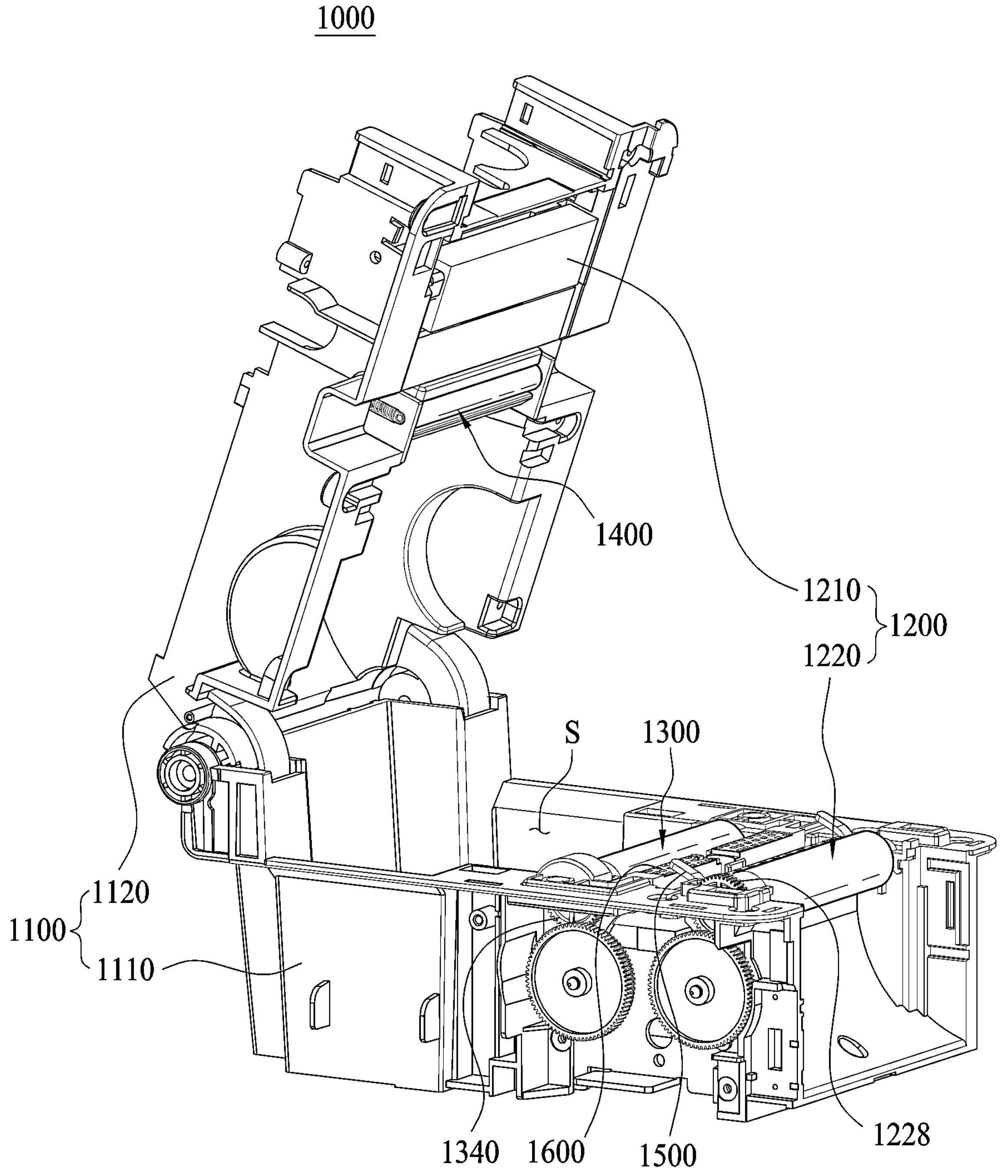
FIG. 18 is a view illustrating a state in which a cover part included in the printing device shown in FIG. 17 is rotated from a body part such that an internal space is opened.
Figure 19:
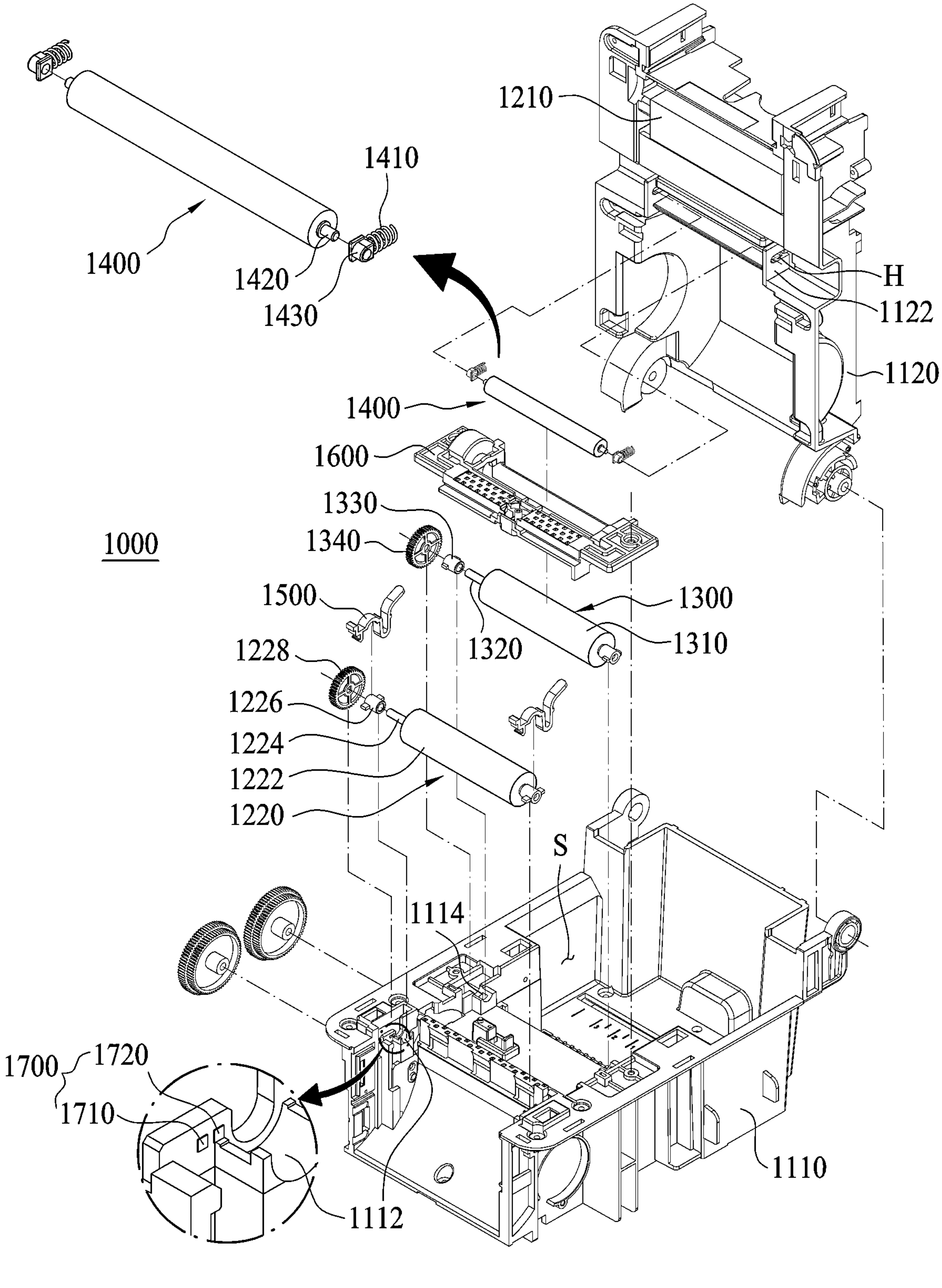
FIG. 19 is an exploded view illustrating the printing device shown in FIG. 17.

FIG. 17 is a schematic internal view illustrating a printing device according to another embodiment of the present invention, FIG. 18 is a view illustrating a state in which a cover part included in the printing device shown in FIG. 17 is rotated from a body part such that an internal space is opened, and FIG. 19 is an exploded view illustrating the printing device shown in FIG. 17.

Referring to FIGS. 17 to 19, a printing device 1000 according to another embodiment of the present invention is a device configured to print certain information on recording paper and may be a device configured to be used adequately for printing, for example, a variety of labels, receipts, tickets, and the like.

The printing device 1000 may be, for example, a thermal printer.

Particular recording paper which reacts to heat may be used in the thermal printer in which heat is applied to the recording paper using a head to form color so as to allow a letter or a picture to be shown.

Also, the recording paper used in the thermal printer may be recording paper with one surface to which an adhesive is applied.

Here, recording paper with particular information printed thereon may be present as a roll inside or outside the printing device 1000 and then may be withdrawn but is not limited thereto and may be present to be folded inside or outside the printing device 1000 and then may be unfolded.

However, hereinafter, for convenience of description, it will be described as an example that the recording paper is present as a roll inside the printing device 1000 and then is withdrawn.

The printing device 1000 may include a main body part 1100, a printing part 1200, a feeding roller 1300, a pressurizing roller 1400, and the like.

The main body part 1100 may include a body part 1110 configured to provide an internal space S in which recording paper for printing certain information thereon is transferred and a cover part 1120 configured to control opening or closing of the internal space S.

The cover part 1120 may be locked up with the body part 1110 to close the internal space S and may be released to be rotatable on the basis of the body part 1110 to open the internal space S.

The printing part 1200 is a component configured to print certain information on the recording paper being transferred inside the internal space S and may include a head 1210 configured to generate heat to print the certain information and a platen roller 1220 disposed at a position corresponding to the head 1210 and configured to transfer the recording paper.

The platen roller 1220 may include a platen roller unit 1222, a platen roller rotating shaft 1224, and a platen roller indicator part 1226 configured to indicate the platen roller. A platen roller driving gear 1228 in connection with a platen roller driving motor (not shown) to rotate the platen roller rotating shaft 1224 may be mounted on the platen roller rotating shaft 1224.

The platen roller indicator part 1226 may be manufactured to have a variety of shapes and may be, for example, a platen roller bearing 1226 mounted on the body part 1110 to smoothly rotate the platen roller rotating shaft 1224 as shown in the drawing.

An additional function of the platen roller indicator part 1226, that is, the platen roller bearing 1226, will be described below.

The feeding roller 1300 is a roller disposed on an upstream side or a downstream side of the platen roller 1220 to feed recording paper and may be disposed on, for example, an upstream side of the platen roller 1220 as shown in the drawings.

Here, a position through which recording paper withdrawn from the roll passes first is the upstream side, and a position through which the recording paper passes later is the downstream side.

The feeding roller 1300 may include a feeding roller unit 1310, a feeding roller rotating shaft 1320, and a feeding roller indicator part 1330 configured to indicate the feeding roller. A feeding roller driving gear 1340 in connection with a feeding roller driving motor (not shown) to rotate the feeding roller rotating shaft 1320 may be mounted on the feeding roller rotating shaft 1320.

The feeding roller indicator part 1330 may be manufactured to have a variety of shapes and may be, for example, a feeding roller bearing 1320 mounted on the body part 1110 to smoothly rotate the feeding roller rotating shaft 1320 as shown in the drawing.

An additional function of the feeding roller indicator part 1330, that is, the feeding roller bearing 1330, will be described below.

The body part 1110 may include a platen roller mounting part 1112 to allow the platen roller 1220 to be mounted thereon and a feeding roller mounting part 1114 to allow the feeding roller 1300 to be mounted thereon.

The platen roller mounting part 1112 may be configured to allow the platen roller indicator part 1226, that is, the platen roller bearing 1226 of the platen roller 1220, to be stably mounted and fixedly located thereon. The feeding roller mounting part 1114 may be configured to allow the feeding roller indicator part 1330, that is, the feeding roller bearing 1330 of the feeding roller 1300, to be stably mounted and fixedly located thereon.

Here, when the platen roller 1220 is stably located on the platen roller mounting part 1112, a platen roller cover part 1500 may be mounted on the body part 1110 so as to prevent the platen roller 1220 from being separated.

Likewise, when the feeding roller 1300 is stably located on the feeding roller mounting part 1114, a feeding roller cover part 1600 may be mounted on the body part 1110 so as to prevent the feeding roller 1300 from being separated.

Meanwhile, the printing device 1000 according to another embodiment of the present invention may include a roller mounting sensing part 1700 configured to sense whether the platen roller 1220 is mounted on the platen roller mounting part 1112 or whether the feeding roller 1300 is mounted on the feeding roller mounting part 1114.

For example, as shown in the drawings, the roller mounting sensing part 1700 may include a platen roller mounting sensing part 1700 configured to sense whether the platen roller 1220 is mounted on the platen roller mounting part 1112.

Also, the platen roller mounting sensing part 1700 may include a first state platen roller mounting sensing part 1710 configured to sense whether the platen roller 1220 mounted on the platen roller mounting part 1112 is in a first state and a second state platen roller mounting sensing part 1720 configured to sense whether the platen roller 1220 mounted on the platen roller mounting part 1112 is in a second state, which will be described below with reference to FIGS. 20 to 22.

The pressurizing roller 1400 may be a roller disposed at a position corresponding to the feeding roller 1300 and configured to allow the recording paper to be fed by an interaction with the feeding roller 1300 when the internal space S is closed by the cover part 1120.

The pressurizing roller 1400 may shift in position to implement a smooth feeding function by providing an adequate pressurizing force to the recording paper located between the pressurizing roller 1400 and the feeding roller 1300 corresponding to reduction of a diameter caused by abrasion according to use of the feeding roller 1300.

Here, when the feeding roller 1300 is mounted on the feeding roller mounting part 1114 and repetitively used, a diameter thereof is gradually reduced by abrasion. In this case, when the pressurizing roller does not shift in position and is located at a fixed position, a gap between the pressurizing roller and the feeding roller 1300 gradually increases.

When the gap between the pressurizing roller and the feeding roller 1300 gradually increases, a feeding function of the recording paper is inevitably degraded. To overcome the degradation, the pressurizing roller 1400 according to the present invention may shift in position corresponding to the reduction in the diameter of the feeding roller 1300.

The pressurizing roller 1400 may shift in position due to an elastic deformation part 1410. The elastic deformation part 1410 may be a type of a coil spring configured to provide a restoring force caused by elastic deformation to the pressurizing roller 1400 and to allow the pressurizing roller 1400 to be pressurized toward the feeding roller 1300.

Within a range of allowing the pressurizing roller 1400 to be pressurized toward the feeding roller 1300, the elastic deformation part 1410 may be another elastic member in addition to the coil spring.

The pressurizing roller 1400 may be mounted on a guide part 1122 of the cover part 1120. A rotating shaft 1420 of the pressurizing roller 1400 may be inserted into the guide part 1122 so that shifting in position of the pressurizing roller 1400 may be guided.

Here, the guide part 1122 may include a lengthwise hole H for shifting in position of the rotating shaft 1420 of the pressurizing roller 1400. The pressurizing roller 1400 may be mounted in the lengthwise hole H to be shiftable in position with a medium part 1430 as a medium.

The medium part 1430 may be a component which is inserted into the lengthwise hole H while the rotating shaft of the pressurizing roller 1400 is inserted, to which the elastic deformation part 1410 fixed to the cover part 1120 is connected, and which is configured to provide the restoring force to the pressurizing roller 1400.

The medium part 1430 may be inserted into the lengthwise hole H from an inside to an outside on the basis of the lengthwise hole H while not being insertable into the lengthwise hole H from the outside to the inside on the basis of the lengthwise hole H. Accordingly, when the rotating shaft 1420 of the pressurizing roller 1400 is inserted into the medium part 1430 and then the medium part 1430 is inserted into the lengthwise hole H, separation from the lengthwise hole H may be prevented so as to prevent the pressurizing roller 1400 from being separated.

Accordingly, the elastic deformation part 1410 may include one end mounted on the medium part 1430 and the other end mounted on a member 1124 (refer to FIG. 20) protruding from a top end of the lengthwise hole H. Accordingly, the pressurizing roller 1400 may be stably located in the lengthwise hole H to be shiftable in position with the medium part 1430 as a medium.

Figure 20:
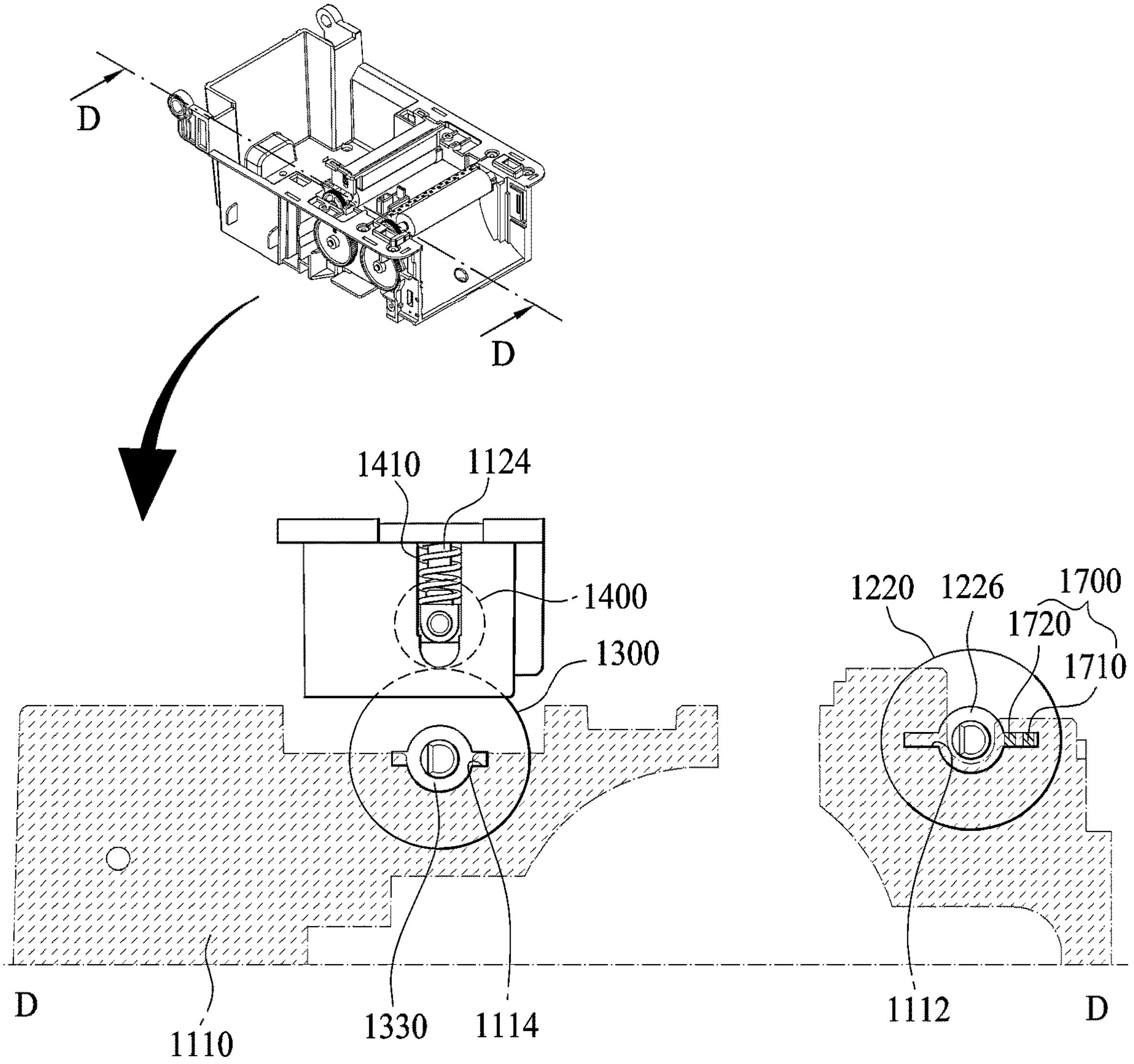
FIG. 20 is a schematic cross-sectional view taken along line DD and illustrating a state of a pressurizing roller while a roller initially provided as a feeding roller and a roller initially provided as a platen roller are mounted on a body part.
Figure 21:
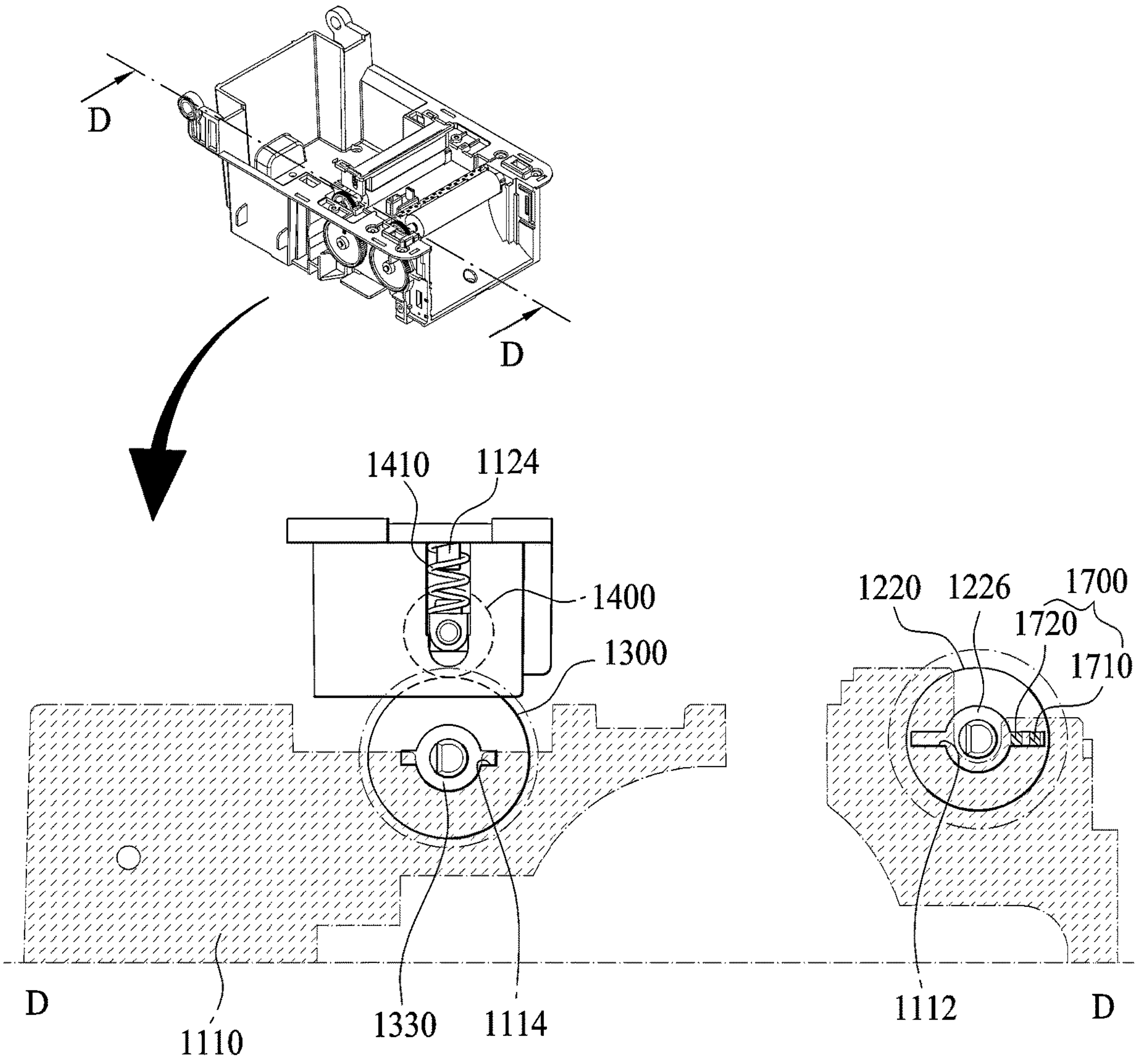
FIG. 21 is a schematic cross-sectional view taken along line DD of FIG. 20 and illustrating a state of the pressurizing roller at a point in time at the end of a service life of the platen roller when the roller initially provided as the platen roller is used.

FIG. 20 is a schematic cross-sectional view taken along line DD and illustrating a state of the pressurizing roller while a roller initially provided as the feeding roller and a roller initially provided as a platen roller are mounted on the body part, and FIG. 21 is a schematic cross-sectional view taken along line DD of FIG. 20 and illustrating a state of the pressurizing roller at a point in time at the end of a service life of the platen roller when the roller initially provided as the platen roller is used.

Figure 22:
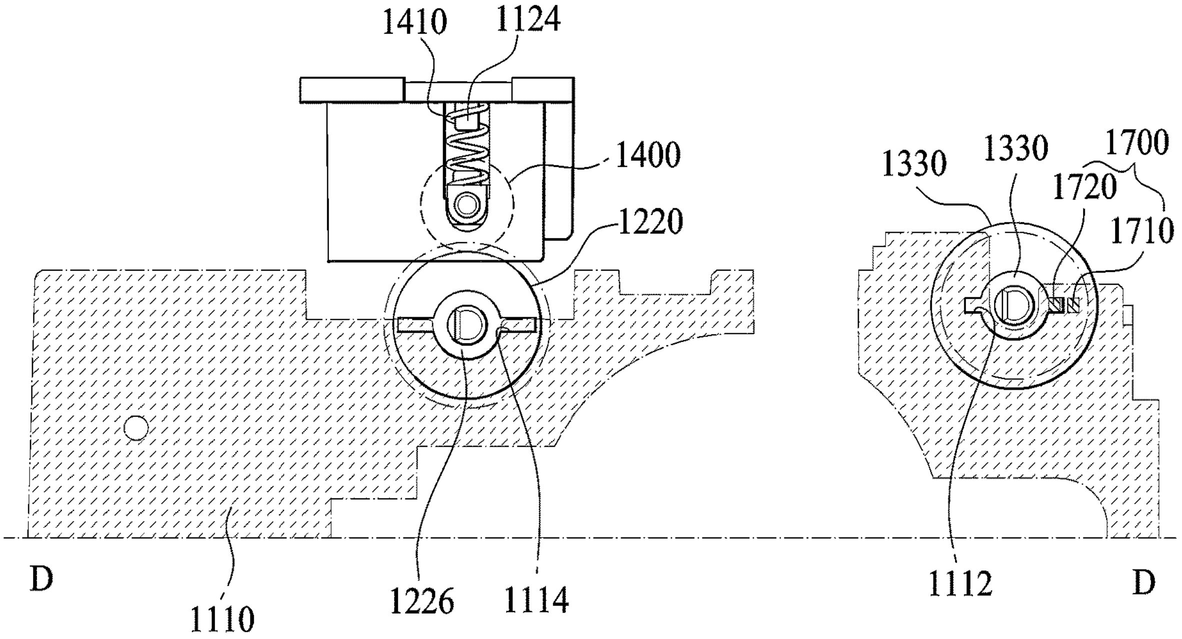
FIG. 22 is a schematic cross-sectional view taken along line DD of FIG. 20 and illustrating a state of the pressurizing roller when the service-life-ended platen roller and the feeding roller being used are replaced with each other.

Also, FIG. 22 is a schematic cross-sectional view taken along line DD of FIG. 20 and illustrating a state of the pressurizing roller when the service-life-ended platen roller and the feeding roller being used are replaced with each other.

First, referring to FIG. 20, the roller initially provided as the platen roller may be mounted on the platen roller mounting part 1112 to function as the platen roller 1220 and the roller initially provided as the feeding roller may be mounted on the feeding roller mounting part 1114 to function as the feeding roller 1300.

In this case, the pressurizing roller 1400 may implement a smooth feeding function of the recording paper by applying an adequate pressurizing force to the feeding roller 1300 corresponding to a diameter of the feeding roller 1300 using the restoring force of the elastic deformation part 1410.

Here, the roller initially provided as the platen roller may have the same diameter as that of the roller initially provided as the feeding roller.

When the roller initially provided as the platen roller is mounted on the platen roller mounting part 1112 to function as the platen roller 1220, the roller mounting sensing part 1700 may sense the mounting.

The roller mounting sensing part 1700 is a type of sensor configured to sense whether the platen roller is mounted on the platen roller mounting part 1112 or whether the feeding roller 1300 is mounted on the feeding roller mounting part 1114 and may include the platen roller mounting sensing part 1700 configured to sense whether the platen roller 1220 is mounted on the platen roller mounting part 1112 or a feeding roller mounting sensing part (not shown) configured to sense whether the feeding roller 1300 is mounted on the feeding roller mounting part 1114.

Hereinafter, it will be described as an example that the roller mounting sensing part 1700 is the platen roller mounting sensing part 1700. It should be noted that components of the platen roller mounting sensing part 1700 are equally applicable to the feeding roller mounting sensing part.

The platen roller mounting sensing part 1700 may sense whether the platen roller 1220 mounted on the platen roller mounting part 1112 is in a first state or a second state having a diameter different from that of the first state on the basis of the diameter.

When the platen roller mounting sensing part 1700 senses whether the platen roller 1220 is in the first state or the second state, a control part that is one component of the printing device 1000 according to another embodiment of the present invention may determine a residual service life of the sensed platen roller 1220 on the basis of a result of sensing by the platen roller mounting sensing part 1700 and may output a replacement time.

When the first state is sensed by the platen roller mounting sensing part 1700 as the first state, the control part may determine the residual service life of the mounted platen roller 1220 to be a predetermined first value. Also, when the second state is sensed by the platen roller mounting sensing part 1700 as the second state, the control part may determine the residual service life of the mounted platen roller 1220 to be a predetermined second value.

That is, when the platen roller 1220 mounted on the platen roller mounting part 1112 is sensed by the first state platen roller mounting sensing part 1710, the control part may determine the residual service life of the mounted platen roller 1220 to be the predetermined first value. Also, when the platen roller 1220 mounted on the platen roller mounting part 1112 is sensed by the second state platen roller mounting sensing part 1720, the control part may determine the residual service life of the mounted platen roller 1220 to be the predetermined second value.

Here, the control part may allow a life of the mounted platen roller 1220 corresponding to the predetermined first value or the predetermined second value determined on the basis of the result of sensing by the platen roller mounting sensing part 1700 to be output through an output unit. The output may be performed using a variety of methods such as a method of printing on recording paper, a method of displaying through a display provided in the main body part 1100, a method of displaying through a light emitting diode (LED) or the like, a method of providing a sound, and the like.

In a case in which the first state platen roller mounting sensing part 1710 and the second state platen roller mounting sensing part 1720 are formed as shown in FIG. 20, when the roller initially provided as the platen roller is mounted on the platen roller mounting part 1112 to function as the platen roller 1220, the first state platen roller mounting sensing part 1710 among the platen roller mounting sensing part 1700 senses the platen roller indicator part 1226, that is, the platen roller bearing 1226 mounted on the platen roller mounting part 1112, to allow the platen roller rotating shaft 1224 to smoothly rotate on the platen roller mounting part 1112.

The second state platen roller mounting sensing part 1720 of the platen roller mounting sensing part 1700 also senses the platen roller bearing 1226.

In this case, on the basis of the result of sensing by the first state platen roller mounting sensing part 1710, the control part may determine the residual service life of the mounted platen roller 1220 to be the predetermined first value and may allow the replacement time to be output through a variety of methods such as a method of printing on recording paper, a method of displaying through a display provided in the main body part 1100, a method of displaying through an LED or the like, a method of providing a sound, and the like.

In other words, when the roller initially provided as the platen roller is mounted on the platen roller mounting part 1112 to function as the platen roller 1220, the first state platen roller mounting sensing part 1710 and the second state platen roller mounting sensing part 1270 sense the platen roller bearing 1226. In this case, the control part determines the residual service life of the mounted platen roller 1220 to be the predetermined first value.

The predetermined first value may be, for example, a certain time, a number of revolutions of the platen roller driving motor, or the like.

Also, the output of the replacement time may be performed using a variety of methods, for example, an alarm and the like output when a situation corresponding to the predetermined first value occurs.

The predetermined first value may be set to be different according to a diameter, material, and/or the like of the roller initially provided as the platen roller. This information may be prestored in a storage unit of the printing device 1000 according to another embodiment of the present invention.

Hereinafter, it is assumed that the roller shown in FIG. 20 is the roller initially provided as the platen roller and the predetermined first value of the roller initially provided as the platen roller is 5,000 revolutions of the platen roller driving motor.

The first state platen roller mounting sensing part 1710 may sense the platen roller bearing 1226, and the control part determines the residual service life of the mounted platen roller to be the predetermined first value that is 5000 revolutions of the platen roller driving motor.

When the printing device 1000 according to another embodiment of the present invention is continuously used, diameters of the feeding roller 1300 and the platen roller 1220 are gradually reduced due to abrasion.

Here, a degree of reduction in a diameter of the feeding roller 1300 and a degree of reduction in a diameter of the platen roller 1220 may differ from each other. Generally, the degree of reduction in the diameter of the platen roller 1220 caused by abrasion is greater than that of the feeding roller 1300.

This is because a pressing force between the platen roller 1220 and the head 1210 is greater than a pressing force between the feeding roller 1300 and the pressurizing roller 1400.

Meanwhile, when the diameter of the feeding roller 1300 is continuously reduced, the pressurizing roller 1400 gradually shifts in position toward the feeding roller 1300 due to a restoring force of the elastic deformation part 1410. Accordingly, an adequate pressurizing force is applied to the feeding roller 1300 to continue a function of smoothly feeding the recording paper.

When the printing device 1000 according to another embodiment of the present invention is continuously used and the number of revolutions of the platen roller driving motor becomes 5,000, the control part determines that the service life of the platen roller 1220 currently being used is ended and controls the replacement time to be output through an output unit such as an alarm and the like.

The output of the replacement time may be performed using the above-described variety of methods such as a method of printing on recording paper, a method of displaying through a display provided in the main body part 1100, a method of displaying through an LED or the like, and the like.

When the number of revolutions of the platen roller driving motor is 5,000 and the life of the currently used platen roller 1220 is exhausted, a diameter of the service-life-ended platen roller 1220 is smaller than a diameter of the currently used feeding roller 1300 as shown in FIG. 21.

In this case, a user recognizes a point in time of replacement of the platen roller 1220 due to the output of the replacement time and opens the internal space S by releasing the locked cover part 1120 and rotating the cover part 1120 from the body part 1110 to replace the service-life-ended platen roller 1220.

When the internal space S is opened, the platen roller cover part 1500 and the feeding roller cover part 1600 are separated from the body part 1110 and the service-life-ended platen roller 1220 is replaced with the currently used feeding roller 1300 as shown in FIG. 22.

The service-life-ended platen roller 1220 may be replaced with the currently used feeding roller 1300 due to a common roller function.

That is, since both the platen roller 1220 and the feeding roller 1300 perform the function of smoothly feeding the recording paper, when they can perform the feeding function at positions thereof, they may be replaced with each other.

When the service-life-ended platen roller 1220 and the currently used feeding roller 1300 are replaced with each other at a point in time of the end of service life the platen roller 1220 while the diameter of the service-life-ended platen roller 1220 is smaller than the diameter of the currently used feeding roller 1300, the pressurizing roller 1400 may shift in position corresponding to the diameter of the service-life-ended platen roller 1220 which has been replaced and located.

Accordingly, the function of smoothly feeding recording paper may be continuously performed by applying an adequate pressurizing force to the service-life-ended platen roller 1220 functioning as the feeding roller.

In other words, the service-life-ended platen roller 1220 may function as the feeding roller even when the diameter thereof is small in comparison to the currently used feeding roller 1300. Since the diameter of the currently used feeding roller 1300 is reduced while being utilized as the platen roller and the currently used feeding roller 1300 is able to be used as the platen roller, service lives of the rollers may be increased by mutual replacement.

Meanwhile, as shown in FIG. 22, when the service-life-ended platen roller 1220 and the feeding roller 1300 being used mounted on the feeding roller mounting part 1114 are replaced with each other at the point in time of replacement of the service-life-ended platen roller 1220, an object to be sensed by the first state platen roller mounting sensing part 1710 is not present and only an object to be sensed by the second state platen roller mounting sensing part 1720 is present.

In other words, the feeding roller indicator part 1330, that is, the feeding roller bearing 1330 of the roller initially provided as the feeding roller may be formed to differ from the platen roller indicator part 1226, that is, the platen roller bearing 1226 of the roller initially provided as the platen roller and, for example, may include a smaller wing part.

Accordingly, only the second state platen roller mounting sensing part 1720 senses the feeding roller bearing 1330 which is the feeding roller indicator part 1330 of a new platen roller 1300 to be mounted on the platen roller mounting part 1112 and which is the feeding roller 1300 mounted on the feeding roller mounting part 1114 and used at the point in time of replacement.

In this case, the control part may determine a residual service life of the new platen roller 1300 to be the predetermined second value, and the predetermined second value may be, for example, 2,000 revolutions of the platen roller driving motor.

The predetermined second value may vary according to a diameter of the new platen roller 1300 and may be prestored in the storage unit of the printing device 1000 according to another embodiment of the present invention through experiences or the like.

When the printing device 1000 according to another embodiment of the present invention is continuously used and the number of revolutions of the platen roller driving motor becomes 2,000, the control part determines that the service life of the platen roller 1220 being currently used is ended and controls the replacement time to be output through an output unit such as an alarm and the like.

The output of the replacement time may be performed using the above-described variety of methods such as a method of printing on recording paper, a method of displaying through a display provided in the main body part 1100, a method of displaying through an LED or the like, and the like.

Meanwhile, in order to prevent a life from being determined according to a result of abnormal sensing of the second state platen roller mounting sensing part 1720, the control part may determine the residual service life of the new platen roller 1300 to be the predetermined second value on the basis of a result of sensing by the second state platen roller mounting sensing part 1720 after the new platen roller 1300 is mounted on the platen roller mounting part 1112 and predetermined conditions are satisfied.

Here, the abnormal sensing may include a case in which only the second state platen roller mounting sensing part 1720 is sensed due to a user's inattention or the like. This is because it is impossible to estimate a precise life when the control part determines even this case to be the predetermined second value.

The predetermined conditions may include a certain time, a number of revolutions of a motor configured to provide power for rotation of the new platen roller 1300, a point in time when the internal space is closed by the cover part 1120 of the main body part 1100, and the like.

Meanwhile, it has been described above that the control part determines the residual service life of the mounted platen roller 1220 using results of sensing by the first state platen roller mounting sensing part 1710 and the second state platen roller mounting sensing part 1720.

However, the control part may determine the residual service life of the mounted platen roller 1220 to be the predetermined first value or the predetermined second value only using the first state platen roller mounting sensing part 1710.

That is, when the result of sensing by the first state platen roller mounting sensing part 1710 exists, the control part may determine the residual service life of the mounted platen roller 1220 to be the predetermined first value. When the result of sensing by the first state platen roller mounting sensing part 1710 does not exist, the control part may determine the residual service life of the mounted platen roller 1220 to be the predetermined second value.

Here, while the result of sensing by the first state platen roller mounting sensing part 1710 does not exist, when the internal space is closed by the cover part 1120 of the main body part 1100 and the platen roller driving motor is driven, the control part may determine the residual service life of the mounted platen roller 1220 to be the predetermined second value.

Figure 23:
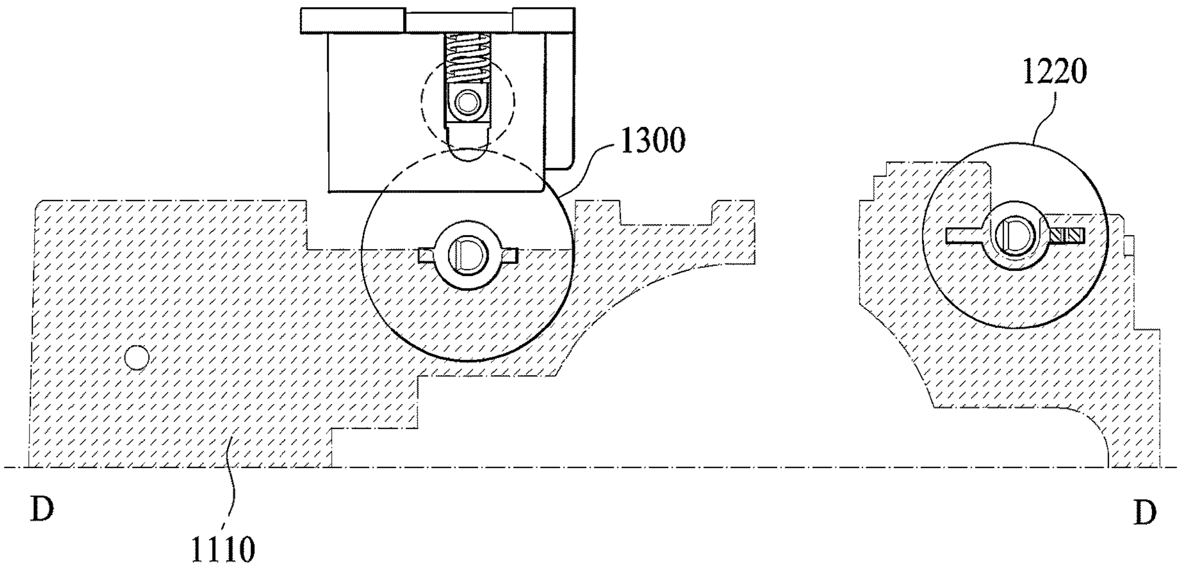
FIG. 23 is a schematic cross-sectional view taken along line DD of FIG. 20 and illustrating a state in which the roller initially provided as the feeding roller has a diameter greater than the roller initially provided as the platen roller.

FIG. 23 is a schematic cross-sectional view taken along line DD of FIG. 20 and illustrating a state in which the roller initially provided as the feeding roller has a diameter greater than that of the roller initially provided as the platen roller.

Referring to FIG. 23, when the roller initially provided as the feeding roller is mounted on the body part 1110 and used as the feeding roller 1300 and the roller initially provided as the platen roller is mounted on the body part 1110 and used as the platen roller 1220, the roller initially provided as the feeding roller may have a diameter larger than that of the roller initially provided as the platen roller.

This is to allow the roller initially provided as the feeding roller to be replaced with the service-life-ended platen roller 1220 at a point in time at the end of service life of the roller initially provided as the platen roller after being used as the platen roller 1220 and to function as the platen roller for a long time.

Even when the diameter of the roller initially provided as the feeding roller is equal to the diameter of the roller initially provided as the platen roller, as described above with reference to FIGS. 20 to 22, the roller initially provided as the platen roller may be used as the platen roller 1220 and then may be replaced with the roller initially provided as the feeding roller at a point in time of exhaustion.

Figure 24:
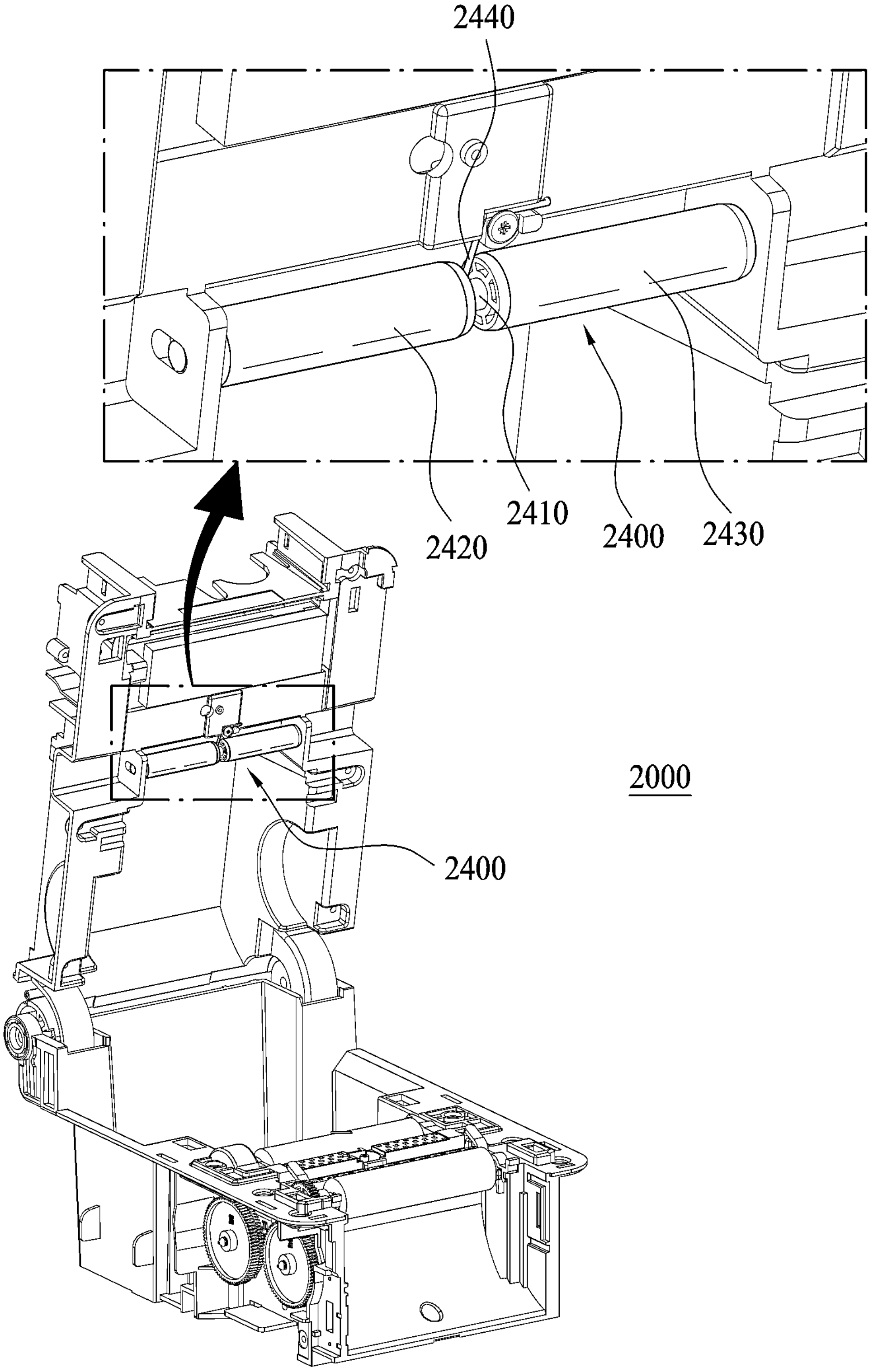
FIG. 24 is a schematic internal view illustrating a printing device according to still another embodiment of the present invention.
Figure 25:
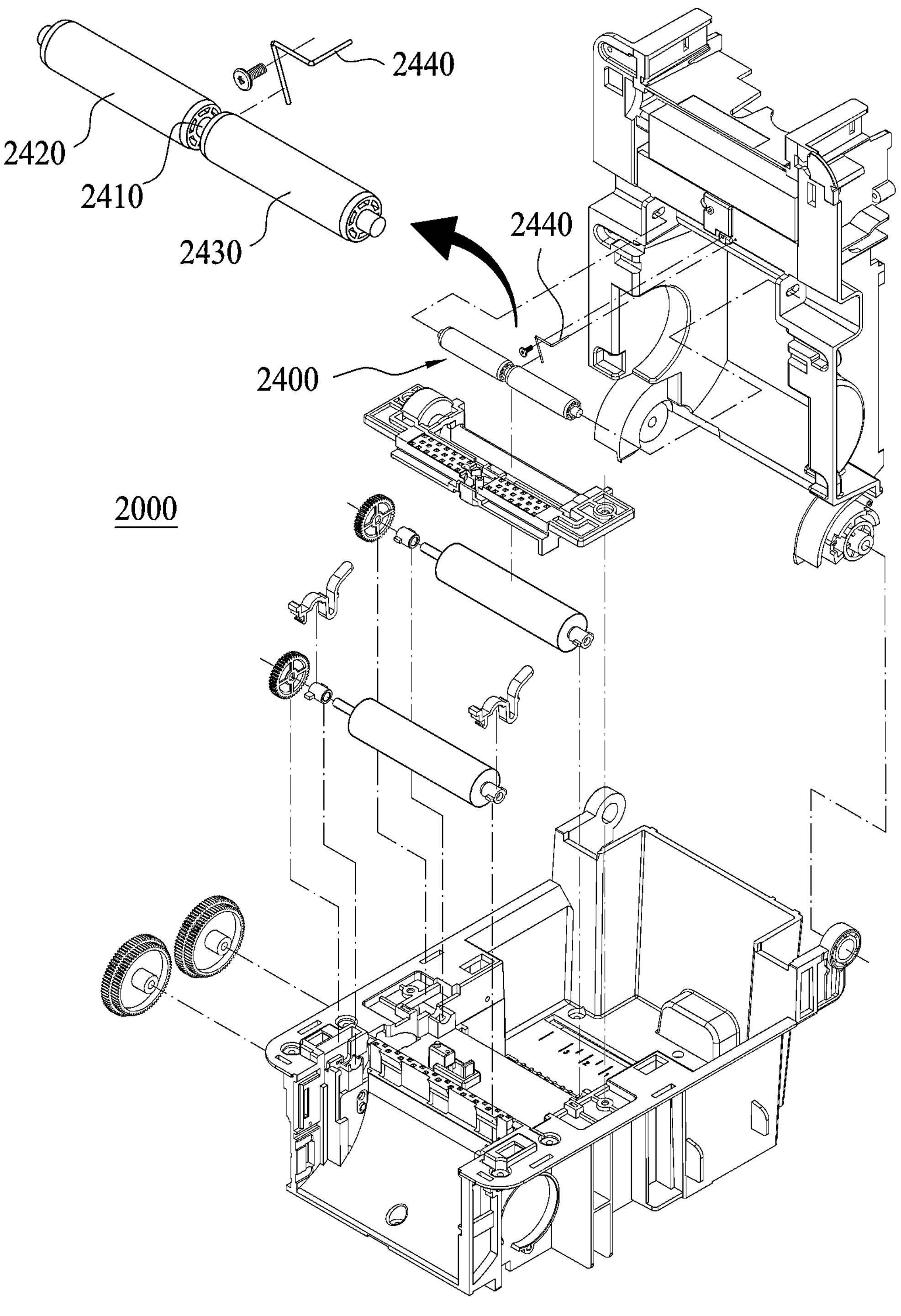
FIG. 25 is a view illustrating a state in which a cover part included in the printing device shown in FIG. 24 is rotated from a body part such that an internal space is opened.

FIG. 24 is a schematic internal view illustrating a printing device according to still another embodiment of the present invention, and FIG. 25 is a view illustrating a state in which a cover part included in the printing device shown in FIG. 24 is rotated from a body part such that an internal space is opened.

Referring to FIGS. 24 and 25, since a printing device 2000 according to still another embodiment of the present invention has the same components and effects, excluding a pressurizing roller 2400, in comparison to the printing device 1000 according to another embodiment of the present invention described with reference to FIGS. 17 to 23, a description in addition to the pressurizing roller 2400 will be omitted.

The pressurizing roller 2400 may include a first pressurizing roller 2420 and a second pressurizing roller 2430 which share a rotating shaft 2410. An elastic deformation part 2440 for shifting position of the pressurizing roller 2400 may pressurize the rotating shaft 2410 exposed between the first pressurizing roller 2420 and the second pressurizing roller 2430 so as to provide a restoring force to the pressurizing roller 2400.

According to the present invention, a printing device can effectively solve problems such as soiling a surface opposite an adhesive surface with an adhesive, which is caused by recording paper provided as a roll and accumulation of the adhesive derived therefrom.

Also, it is possible to effectively solve a problem such as a jamming phenomenon and the like by preventing a phenomenon that an end of the recording paper is rolled due to the recording paper being provided as the roll.

Also, it is possible to implement smooth transfer of the recording paper to print the certain information thereon regardless of a reduction in a diameter of a feeding roller caused by abrasion thereof.

Also, it is possible to prevent degradation of printing qualities by estimating an accurate replacement time of a platen roller.

Also, it is possible to increase a period of use of the rollers by replacing the feeding roller and the platen roller with each other.

Although the components and features of the present invention have been described on the basis of the embodiments of the present invention, the present invention is limited thereto. Also, it is apparent to those skilled in the art that a variety of changes and modifications may be made without departing from the concept and scope of the present invention. Therefore, it should be noted that the changes and modifications are included in the claims.

What is claimed is:

1. A printing device comprising:

a main body portion configured to provide an internal space in which recording paper provided in a form of roll paper is unwound and transferred; and a printing portion configured to print predetermined information on the recording paper, wherein the printing portion includes a head for printing the predetermined information and a platen roller disposed at a position corresponding to the head to transfer the recording paper, wherein the main body portion includes a support portion for supporting a surface opposite to an adhesive surface in a process of discharging the recording paper on which the predetermined information is printed to the outside, wherein the surface opposite to the adhesive surface is a surface on which the predetermined information is printed, and the support portion has a corroded area formed to be coarse due to corrosion.

2. The printing device of claim 1, wherein the support portion includes a plurality of protruding portions formed to be spaced apart from each other.

3. The printing device of claim 2, wherein the plurality of protruding portions are formed to be spaced apart from each other along a discharge direction of the recording paper on which the predetermined information is printed.

4. The printing device of claim 2, wherein the plurality of protruding portions are formed in the corroded area.

5. The printing device of claim 1, wherein the support portion includes the corroded area, and a non-corroded area formed in at least one of the upstream side and downstream side of the corroded area.

6. The printing device of claim 5, wherein the corroded area is provided with the plurality of protrusions formed to be spaced apart from each other.

7. The printing device of claim 1, wherein the support portion includes an upstream support portion positioned on an upstream side based on the printing portion, and a downstream support portion positioned on a downstream side, and at least one of the upstream support portion and the downstream support portion has the corroded area.

8. The printing device of claim 1, wherein the corroded area is provided between the printing portion and a discharge port through which the recording paper on which the predetermined information is printed is discharged to the outside, based on a path through which the recording paper on which the predetermined information is printed is discharged.

9. The printing device of claim 1, further comprising a recording paper separation portion that is positioned on a downstream side of the printing portion and cuts or perforates the recording paper on which the predetermined information is printed to allow the printing portion to separate the recording paper on which the predetermined information is printed from remaining sheets of recording paper, wherein the corroded area is provided between the printing portion and the recording paper separation portion based on a path through which the recording paper on which the predetermined information is printed is discharged.

* * * * *